United States Patent
McClatchie et al.

(10) Patent No.: US 9,503,639 B2
(45) Date of Patent: Nov. 22, 2016

(54) DISTORTION CORRECTING SENSORS FOR DIAGONAL COLLECTION OF OBLIQUE IMAGERY

(71) Applicant: Tolo, Inc., Los Altos, CA (US)

(72) Inventors: Iain Richard Tyrone McClatchie, Los Altos, CA (US); David Levy Kanter, San Francisco, CA (US)

(73) Assignee: Tolo, Inc., Los Altos, CA (US)

( * ) Notice: Subject to any disclaimer, the term of this patent is extended or adjusted under 35 U.S.C. 154(b) by 0 days.

(21) Appl. No.: 14/774,918

(22) PCT Filed: Mar. 15, 2014

(86) PCT No.: PCT/US2014/030058
§ 371 (c)(1),
(2) Date: Sep. 11, 2015

(87) PCT Pub. No.: WO2014/145319
PCT Pub. Date: Sep. 18, 2014

(65) Prior Publication Data
US 2016/0037080 A1    Feb. 4, 2016

Related U.S. Application Data

(60) Provisional application No. 61/786,311, filed on Mar. 15, 2013.

(51) Int. Cl.
*H04N 5/232* (2006.01)
*H04N 5/369* (2011.01)
(Continued)

(52) U.S. Cl.
CPC ........... *H04N 5/23238* (2013.01); *G01C 11/02* (2013.01); *G06T 5/50* (2013.01);
(Continued)

(58) Field of Classification Search
CPC ........... H04N 5/23238; H04N 5/2352; H04N 5/3696; H04N 7/181; G06T 2207/10021; G06T 2207/10028; G06T 2207/10036; G06T 2207/30181; G06T 5/50; G06T 7/004; G06T 7/0051; G06T 2207/20221; G08G 5/0078; G08G 5/0086; G01C 11/02
See application file for complete search history.

(56) References Cited

U.S. PATENT DOCUMENTS 6,201,574 B1    3/2001  Martin
6,353,678 B1    3/2002  Guo et al.
(Continued)

FOREIGN PATENT DOCUMENTS

EP    1227683 A1    7/2002
JP    3300341 B2    7/2002
(Continued)

OTHER PUBLICATIONS

"Standard Specifications for Aerial Photography", Appendix 2 of "Aerial Survey Handbook 1938", Jan. 1, 1938, U.S. Department of Agriculture, Forest Service, as downloaded Sep. 16, 2014 from "http://books.google.com/books?d=iZIOAAAAMAAJ& dq=aerial& pg=RA1-PA8#v=onepage&q=aerial&f=false", 26 pages.

(Continued)

*Primary Examiner* — Dave Czekaj
*Assistant Examiner* — Md Haque
(74) *Attorney, Agent, or Firm* — PatentVentures; Bennett Smith; Korbin Van Dyke

(57) ABSTRACT

A vehicle collects oblique imagery along a nominal heading using rotated camera-groups with optional distortion correcting electronic image sensors that align projected pixel columns or rows with a pre-determined direction on the ground, thereby improving collection quality, efficiency, and/or cost. In a first aspect, the camera-groups are rotated diagonal to the nominal heading. In a second aspect, the distortion correcting electronic image sensors align projected pixel columns or rows with a pre determined direction on the ground. In a third aspect, the distortion correcting electronic image sensors are rotated around the optical axis of the camera. In a fourth aspect, cameras collect images in strips and the strips from different cameras overlap, providing large-baseline, small-time difference stereopsis.

20 Claims, 13 Drawing Sheets

(51) Int. Cl.
| | |
|---|---|
| *H04N 5/33* | (2006.01) |
| *H04N 5/235* | (2006.01) |
| *G06T 7/00* | (2006.01) |
| *G06T 5/50* | (2006.01) |
| *G08G 5/00* | (2006.01) |
| *H04N 7/18* | (2006.01) |
| *H04N 5/247* | (2006.01) |
| *H04N 5/357* | (2011.01) |
| *G01C 11/02* | (2006.01) |

(52) U.S. Cl.
CPC ............ *G06T 7/004* (2013.01); *G06T 7/0051* (2013.01); *G08G 5/0078* (2013.01); *G08G 5/0086* (2013.01); *H04N 5/2352* (2013.01); *H04N 5/23229* (2013.01); *H04N 5/247* (2013.01); *H04N 5/332* (2013.01); *H04N 5/357* (2013.01); *H04N 5/3696* (2013.01); *H04N 7/181* (2013.01); *G06T 2207/10021* (2013.01); *G06T 2207/10028* (2013.01); *G06T 2207/10036* (2013.01); *G06T 2207/20221* (2013.01); *G06T 2207/30181* (2013.01)

(56) References Cited

U.S. PATENT DOCUMENTS

| | | | |
|---|---|---|---|
| 6,911,997 | B1 | 6/2005 | Okamoto et al. |
| 7,127,348 | B2 | 10/2006 | Smitherman |
| 7,424,133 | B2 | 9/2008 | Schultz et al. |
| 8,670,961 | B2 | 3/2014 | Pershing et al. |
| 8,687,062 | B1* | 4/2014 | Reece .................. G05D 1/0094 248/323 |
| 9,065,985 | B2 | 6/2015 | McClathchie et al. |
| 9,071,732 | B2 | 6/2015 | McClatchie et al. |
| 2002/0191078 | A1* | 12/2002 | Okamoto .................. B60R 1/00 348/148 |
| 2005/0177307 | A1 | 8/2005 | Greenfeld et al. |
| 2005/0220363 | A1* | 10/2005 | Oldroyd ................. G01C 11/00 382/294 |
| 2006/0215935 | A1 | 9/2006 | Oldroyd |
| 2006/0239537 | A1 | 10/2006 | Shragai |
| 2006/0291744 | A1 | 12/2006 | Ikeda et al. |
| 2007/0188653 | A1 | 8/2007 | Pollock et al. |
| 2007/0206945 | A1 | 9/2007 | DeLorme et al. |
| 2009/0201361 | A1 | 8/2009 | Lyon et al. |
| 2009/0295625 | A1 | 12/2009 | Voelker |
| 2011/0025489 | A1 | 2/2011 | Shimoda et al. |
| 2011/0076004 | A1 | 3/2011 | Petitti |
| 2011/0169958 | A1* | 7/2011 | Imai ..................... B60W 30/12 348/149 |
| 2012/0288158 | A1 | 11/2012 | Schultz et al. |
| 2013/0027554 | A1 | 1/2013 | Meadow |

FOREIGN PATENT DOCUMENTS

| | | |
|---|---|---|
| KR | 10-2008-0106119 A | 12/2008 |
| KR | 10-1008972 B1 | 1/2011 |
| KR | 10-1105795 B1 | 1/2012 |
| WO | 2014/145319 A1 | 9/2014 |
| WO | 2014/145328 A1 | 9/2014 |

OTHER PUBLICATIONS

International Search Report in related PCT/US2014/030058, Aug. 4, 2014, 4 pages.
Written Opinion in related PCT/US2014/030058, Aug. 4, 2014, 6 pages.
"MultiVision an indispensable tool for analysing oblique imagery", Published by Getmapping.com, as downloaded Sep. 16, 2014 from "http://www2.getmapping.com/App_Themes/Default/CMS/PDFs/GM MultiVision v6.pdf", 6 pages.
"Getmapping Reveals New 'AZICAM' Oblique Camera System", Jun. 30, 2009, press release by Getmapping.com, as downloaded Sep. 16, 2014 "from http://www2.getmapping.com/App_Themes/Default/CMS/PDFs/GM_Azicam.pdf", 2 pages.
"Multiscale gigapixel photography", D.J. Brady, et al., Nature, vol. 486, Jun. 21, 2012, pp. 386-389, 4 pages.
"One Sensor to Do the Work of Many; BAE, DARPA Lash Up Hundreds of 5-Megapixel Camera Chips", William Matthews, Published by Defensenews.com, Mar. 1, 2010, as downloaded Sep. 16, 2014 from "http://www.defensenews.com/article/20100301/DEFFEAT01/3010309/One-Sensor-To-Do-The-Work-of-Many", 4 pages.
"Systematic Oblique Aerial Photography Using Multiple Digital Cameras", Gordon Petrie, conference presentation of "VIII International Scientific & Technical Conference 'From Imagery to Map: Digital Photogrammetric Technologies', Sep. 15-18, 2008—Porec, Croatia", 44 pages.
"Autonomous Real-time Ground Ubiquitous Surveillance—Imaging System (ARGUS-IS)", Brian Leininger et al, published in "Defense Transformation and Net-Centric Systems 2008", edited by Raja Suresh, Proc. of SPIE vol. 6981 69810H-1 to 69810H-11, 11 pages.
"High Resolution Ortho and Oblique Imagery—Local Government Imagery Applications", Justin Knight, Pictometry International Corp., "Mid-Coast Regional Planning Commission (MCRPC)—Rockland, Maine, Workshop Presentations: Pictometry—Ortho and Oblique Aerial Imagery Oct. 27, 2011", as downloaded Sep. 16, 2014 from "http://www,midcoastplanning.org/ resourceDownloads. html", 113 pages.
"Aerial Mapping Methods and Applications" Second Edition, Edgar Falkner et al., Lewis Publishers; A CRC Press Company, ISBN 1-56670-557-6, 2002, as downloaded Sep. 16, 2014 from "http://books.google.com/books?d=N8W4CI6a__LsC&Ipg=PP1&dq=aerial&pg=PP1#v=onepage&q=aerial&f=false", pp. 68-71 plus title and copyright pages, formatted as 4 pages.
"Feature: Simplifying Aerial Surveys; Integrating direct georeferencing with flight management makes aerial surveying faster and more accurate." Joe Hutton et al., Professional Surveyor Magazine, May 2009, as downloaded Sep. 16, 2014 from "http://archives.profsurv.com/magazine/article.aspx?i=70241", 3 pages.
"Southeast GAP/Aerial Photography; Landcover Mapping; Digital Aerial Photography Library", as downloaded Sep. 16, 2014 from "http:/ /www.basic.ncsu.edu/segap/ AirPhoto.html", 5 pages.
"Using Strip-transect Aerial Surveys to Estimate Manatee Abundance in the Ten Thousand Islands Region of Southwest Florida", USGS (U.S. Geological Survey), Dean E. Easton et al., poster presented Apr. 2003, at the "Greater Everglades Ecosystem Restoration Conference", as downloaded Sep. 16, 2014 from "http://sofia.us.gs. gov Igeer/2003/ posters/ aerialsurvey/print. html#litcited", 7 sheets of text with embedded small figures plus 5 sheets of enlarged figues totaling 12 pages.
"Standard Specification for Aerial Photography", Appendix 2 of "Aerial Survey Handbook 1938", Jan. 1, 1938, U.S. Department of Agriculture, Forest Service, as downloaded Sep. 16, 2014 from "http://books.google.com/books?d=iZIOAAAAMAAJ&dq=aerial&pg=RA1-PA8#v=onepage&q=aerial&f=false", 26 pages.
"Optomechanical design of multiscale gigapixel digital camera", Hui S. Son et al., Applied Optics. vol. 52, No. 8, Mar. 10, 2013, pp. 1541-1549, 9 pages.
"CITIPIX by Kodak Global Imaging; A Case Study on Private Sector Contribution to Global Spatial Data Infrastructure", conference paper by Kodak Global Imaging, GSDI 5 Cartagena, Colombia, May 21-24, 2001, as downloaded Sep. 16, 2014 from "http://www.gsdi.org/gsdiconf/gsdiconfdocs/gsdi-5", 15 pages.
"CITIPIX Program by Kodak Global Imaging; A Case Study on Private Sector Contribution to Global Spatial Data Infrastructure", conference presentation by Kodak Global Imaging, GSDI 5 Cartagena, Colombia, May 21-24, 2001, as downloaded Sep. 16, 2014 from "http://www.gsdi.org/gsdiconf/gsdiconfdocs/gsdi-5", 13 pages.
International Search Report in related PCT/US2014/030068, Aug. 19, 2014, 4 pages.

(56) References Cited

OTHER PUBLICATIONS

Written Opinion in related PCT/US2014/030068, Aug. 19, 2014, 5 pages.
European Patent Office, European Search Report, Feb. 22, 2016, 12 pages.

International Preliminary Report on Patentability, Patent Cooperation Treaty, International Application No. PCT/US2014/030058, Aug. 4, 2014, 7 pages.

* cited by examiner

DISTORTION CORRECTING SENSORS FOR DIAGONAL COLLECTION OF OBLIQUE IMAGERY

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application (Ser. No. 61/786,311), filed Mar. 15, 2013, first named inventor Iain Richard Tyrone MCCLATCHIE, and entitled DIAGONAL COLLECTION OF OBLIQUE IMAGERY.

BACKGROUND

Field

Advancements in photogrammetry are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

An example of a camera is an image capturing system that captures imagery using a lens that focuses light on at least one Petzval surface (e.g., a focal plane), and captures an image with at least one image sensor on the Petzval surface. A focal plane is an example of a planar Petzval surface. In some scenarios, Petzval surfaces are not necessarily planar and are optionally curved due to the design of the lens. Examples of image sensors include film and electronic image sensors. Examples of electronic image sensors include Charge Coupled Device (CCD) sensors and Complementary Metal-Oxide Semiconductor (CMOS) sensors, such as those manufactured by Aptina. An example of an emerging optical axis of a camera is the path along which light travels from the ground at the center of the lens field of view to arrive at the entrance to the camera. The light path inside the camera may be folded with reflecting surfaces, but eventually light arriving along the emerging optical axis will converge at the center of the Petzval surface(s). An example of an acute angle is an angle greater than zero degrees and less than 90 degrees. An example of an oblique angle, such as an acute or an obtuse angle, is an angle that is not a right angle (e.g. 90 degrees) and is not a multiple of a right angle (e.g. not modulo 90 degrees).

Some maps assume a camera perspective looking straight down, called an orthographic (or nadir) perspective. In some embodiments and/or scenarios, this is also the perspective of the captured images used to make these maps (e.g., orthographic imagery). However, orthographic imagery eliminates all information about the relative heights of objects, and information about some surfaces (e.g., the vertical face of a building).

Other maps assume a camera perspective looking down at an angle below the horizon but not straight down, called an oblique perspective. An example of a down angle of a camera is the angle of the emerging optical axis of the camera above or below the horizon; down angles for nadir perspectives are thus 90 degrees; down angles for oblique perspectives are e.g., 20 to 70 degrees. In some embodiments and/or scenarios, the camera used to capture an oblique perspective is referred to as an oblique camera and the resulting images are referred to as oblique imagery. In some scenarios, oblique imagery is beneficial because it presents information that is useful to easily recognize objects and/or locations (e.g., height and vertical surfaces); information that is sometimes missing from orthographic imagery.

In some embodiments, the same point on the ground is captured with oblique images captured from multiple perspectives (e.g., 4 perspectives looking at a building, one from each cardinal direction: North, South, East, and West). This is sometimes described as ground-centric collection, and yields ground-centric oblique imagery. In various scenarios, ground-centric aerial oblique imagery is useful, e.g., for assessing the value of or damage to property, particularly over large geographic areas. In some scenarios, it is a priority in a ground-centric collection program to collect an image of every point in some defined target area for each of the cardinal directions. The capture resolution is measured in distance units on the ground (e.g., 4 inch per pixel) and sometimes does not vary much between different points in the target area.

In some embodiments, multiple oblique images are captured from a single point, with multiple perspectives (e.g., 4 perspectives looking from a building in each cardinal direction), also known as sky-centric collection. In some scenarios, sky-centric imagery is used to form a panoramic view from a single point. In some scenarios, it is a priority in a sky-centric collection program to collect a continuous panorama from each viewpoint. Capture resolution is sometimes measured in angular units at the viewpoint (e.g., 20,000 pixels across a 360 degree panorama).

In various embodiments, a camera-group is a system of one or more cameras that approximately capture the same image (e.g., the optical axes are aligned within 5 degrees of a common reference axis). For example, an ordinary pair of human eyes acts as a 2 camera-group, focusing on a single image. In various scenarios, a camera-group has an arbitrary number of cameras.

In some embodiments, a camera-set is a system of one or more cameras and/or camera-groups that capture different images. One example of a 2 camera-set is a nadir camera and an oblique camera. Another example of a 4 camera-set is 4 oblique cameras, each pointing in a different cardinal direction. In various scenarios, a camera-set has an arbitrary number of cameras and/or camera-groups.

An example of the nominal heading of a vehicle is the overall direction of travel of the vehicle. In many scenarios, the instantaneous direction of travel deviates from the nominal heading. For example, an airplane is flying along a flight path heading due north, so that the nominal heading is north, while experiencing a wind blowing from west to east. To keep the plane on the flight path, the pilot will point the plane into the wind, so that the instantaneous heading is many degrees west of north. As another example, a car is driving down a straight road that runs from south to north and has several lanes. The nominal heading is north. However, to avoid hitting an obstacle, the car changes lanes, instantaneously moving northwest, rather than strictly north. Despite this instantaneous adjustment, the nominal heading is still north. In contrast, when the car turns 90 degrees from north to travel west, the nominal heading is now west.

An example of a plan angle of an oblique camera on a vehicle is the angle between the nominal heading of the vehicle and the emerging optical axis of the camera projected onto the ground plane; plan angles vary from 0-360 degrees. Some cameras are mounted on stabilization platforms so that the camera maintains its plan angle even as the instantaneous heading changes. Some cameras are mounted directly to the vehicle. Note that a vehicle may have a nominal heading, even when stopped, e.g., a helicopter with a flight path due north could stop periodically, but would still have a nominal heading of due north.

Camera-sets used for sky-centric collection expend far more film (and later pixels) on ground points that the vehicle travels directly over, compared to ground points off to the side of the vehicle's path. When aerial photography and photogrammetry began to use airplanes, it became important to use less film to reduce costs. Some camera-sets removed the forward- and rear-facing oblique cameras of the earlier designs, and used a nadir camera and two oblique cameras pointing to the side (e.g., all emerging optical axes approximately perpendicular to the nominal heading of the airplane). While flying in a straight line and capturing overlapping images, these camera-sets capture the same amount of ground area with the same resolution as the more complex panoramic cameras and/or camera-sets, but with less film.

The extent of coverage in the direction of flight (sometimes described as in track) is, in some scenarios, primarily determined by the distance of flight. The extent of coverage orthogonal to the direction of flight (sometimes described as cross track) is, in some scenarios, primarily determined by the plane's altitude and the design of the camera. The extent of coverage in the cross track direction is sometimes called the swath. One benefit of a camera-set with both an oblique camera and a nadir camera is achieving greater swath without complex lens designs (such as a single large Field Of View, e.g., FOV, fisheye).

In some sky-centric collection scenarios, the vehicle is maneuvered until the objects of interest are in view. For some ground-centric collection scenarios, the vehicle moves through a pattern which gives an opportunity to capture each point of interest on the ground from every required direction. In various embodiments, a Maltese Cross camera-set is moved in a path of parallel lines (e.g., flight lines of an airplane) that run in a north-south or east-west direction. As the vehicle moves along the flight lines, the images captured by any particular camera are optionally superposed to form a long continuous strip of coverage. The length of the strip is approximately the length of the flight line, and the width of the strip is known as the swath.

FIG. 1 conceptually illustrates an isometric view of selected prior art details of an airplane 102 with a Maltese Cross style oblique camera-set. The sensor fields of view of the forward 104, right 106, back 108, and left 110 oblique cameras are shown, projected onto the ground. The emerging optical axes of the cameras (respectively 112, 114, 116, and 118) have 45 degree down angles. Down Angle 122 is the angle formed between the Emerging Optical Axis 114 and its projection 120 to a plane parallel to the ground. For clarity, the other down angles are omitted from the illustration.

FIG. 2 conceptually illustrates a plan view of selected prior art details of the field of view of a single example camera of a Maltese Cross camera-set. The conical field of view projects from camera aperture 208 to an ellipse 202 on the planar surface, with the longer major axis of the ellipse pointing away from the center of the camera. The image formed by the lens is a circle 210, shown at the left at a larger scale, and looking down the lens optical axis. The image sensor is an inscribed rectangle 212 that projects to a trapezoid 204 on the surface, because of the down angle of the camera. The image sensor is a rectangular array of pixels arranged in rows 220 and columns 216. Light rays 206 corresponding to the four corners of the image sensor are also shown. The light rays come from the ground up through the lens to the sensor. The pixels of the image sensor are projected onto the ground, forming projected rows 218 and projected columns 214. In the example, the rectangular image sensor is 24 mm by 36 mm, the focal length is 100 mm, and the camera altitude above the surface is 1000 meters. The resulting trapezoid is 455 meters wide at its base and 579 meters wide at its top.

FIG. 3 conceptually illustrates a plan view of selected prior art details of capturing oblique imagery via a Maltese Cross camera-set. In various embodiments, the nominal heading of vehicle 301 is a cardinal direction (e.g., North, South, East, West). The camera-set includes four oblique cameras, with 0, 90, 180, and 270 degree plan angles. For conceptual clarity, the emerging optical axes are drawn in FIG. 3 with a 3 degree offset. Each camera has the same focal length and sensor size as the example camera in FIG. 2. However, the left and right cameras have the longer 36 mm dimension of the sensors aligned with the nominal heading. The projected FOV ellipses of the cameras 304, 308, 312, and 316 contain the projected sensor FOV trapezoids, respectively 302, 306, 310, and 314. Several captured images 320 of the projected FOV trapezoids are shown. The captured images from a single camera in a single flight line form a continuous strip, and there is, in some scenarios, relatively significant forward overlap between images in the strip (e.g., from 50% to 60% overlap between sequentially captured images).

The swaths of the front- and rear-facing cameras are also, in some scenarios, relatively significantly smaller than the separation between the swaths of the side-facing cameras. The front-facing camera swath is between edges 352 and 354, and as noted is, e.g., 458 meters wide. The inner edges of the side facing swaths are denoted by edges 362 and 364, and the space between them 365 is, e.g., 1571 meters.

FIG. 4 conceptually illustrates selected prior art details of an example flight plan for capturing oblique imagery covering Alexandria County, Va., using the Maltese Cross camera-set of FIG. 3. Flight plan 401 is arranged in 25 flight lines (e.g., 402) with nominal headings east or west, separated by 24 turns (e.g., 403) and captures oblique images that are oriented north, south, east and west. The total flight distance is 264 kilometers.

To capture the views offered by the front and rear facing cameras for every point of interest on the ground, the vehicle's flight lines are closer together than the swath of the front and rear facing cameras. In the flight plan depicted in FIG. 4, the flight line pitch is 340 meters, so that there is 25% horizontal overlap between adjacent strips of imagery.

SYNOPSIS

The invention may be implemented in numerous ways, including as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

In some embodiments, the camera designer chooses whether to align either the projected rows or projected columns of the image sensor with the direction of flight. In some embodiments, the column vector, projected onto the ground, is aligned near the nominal heading, leaving the row vector, projected onto the ground, aligned as near as practical to the cross-track direction. An example of a twist angle of an image sensor is the angle between the image sensor row vector and a vector at the Petzval surface, orthogonal to the optical axis, and parallel to the ground plane (sometimes referred to as the horizontal vector).

In one embodiment, the vehicle carries at least four oblique cameras, at least one pointed approximately in each of the four diagonal directions from the nominal heading of the vehicle (e.g., 45, 135, 225 and 315 degree plan angles). In some embodiments, the flight lines of the collection flight plan are in the intercardinal directions (northeast, northwest, southeast, or southwest).

In some embodiments, one or more oblique cameras are rotated relative to the nominal heading of a plane (e.g., 45 degree plan angle). The flight lines of the collection flight plan are in the cardinal directions, and in yet other embodiments the flight lines are in arbitrary directions. In some embodiments, the sensors of the oblique cameras are twisted to align either the projected rows or projected columns of the image sensor with the direction of flight.

In another embodiment, the vehicle carries at least four oblique cameras with distortion correcting electronic image sensors. The electronic image sensors behind each lens have a twist angle such that the columns or rows of the projected sensor field of view are approximately aligned with the nominal heading. In some embodiments, the four oblique cameras are positioned in a Maltese Cross configuration (e.g., plan angles of approximately 0, 90, 180, and 270 degrees), while in other embodiments the four oblique cameras are positioned diagonally (e.g., 45, 135, 225 and 315 degree plan angles).

DETAILED DESCRIPTION

Figure 1:
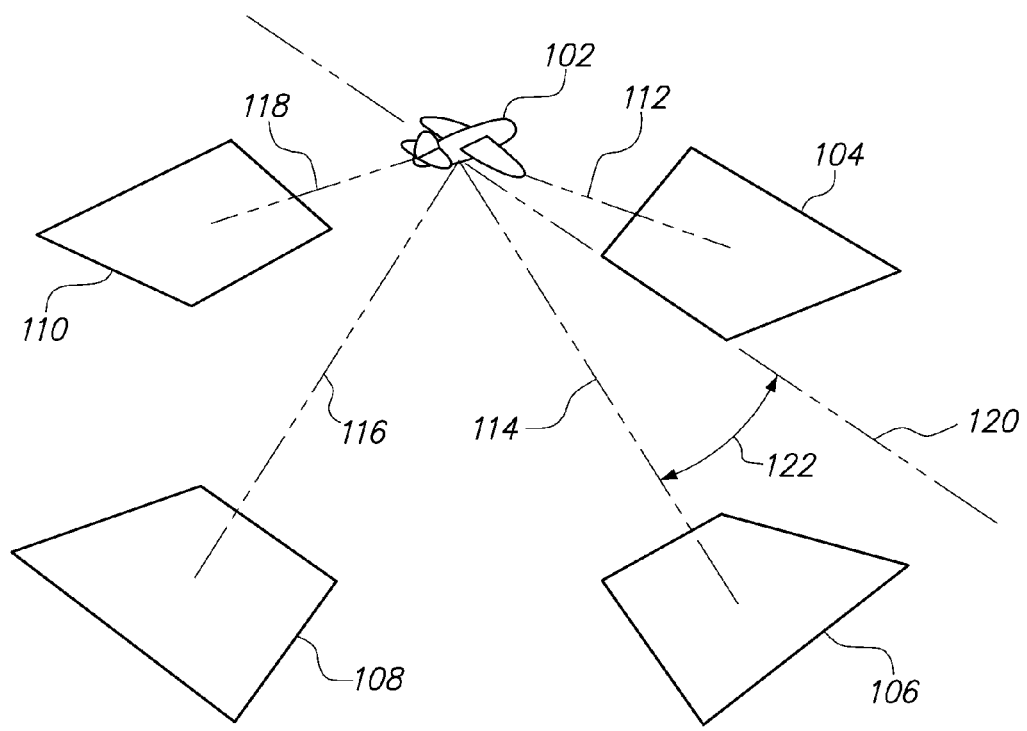
FIG. 1 conceptually illustrates an isometric view of selected prior art details of an airplane with a Maltese Cross style oblique camera-set.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
operating a vehicle in accordance with a nominal heading, the operating comprising having one or more respective camera-groups each enabled to capture oblique imagery via electronic image sensor technology;
configuring each of the respective camera-groups with a respective pre-determined plan angle range; and
establishing the nominal heading as corresponding to a cardinal direction plus a pre-determined angular offset between 10 and 80 degrees, and capturing oblique imagery in at least one cardinal direction with at least one camera of the respective camera-groups.

EC2) The method of EC1, wherein at least one of the respective camera-groups comprises a single camera.

EC3) The method of EC1, wherein at least one of the respective camera-groups comprises multiple cameras.

EC4) The method of EC1, wherein the respective camera-groups comprise N particular camera-groups, each of the N particular camera-groups is associated with a unique integer K between 0 and (N−1) inclusive, and the respective pre-determined plan angle range of the particular camera-group is (180+360*K)/N degrees plus a pre-determined angular offset range.

EC5) The method of EC4, wherein the pre-determined angular offset range is between minus 120/N and plus 120/N degrees.

EC6) The method of EC5, wherein N is four or eight.

EC7) The method of EC1, further comprising configuring a particular electronic image sensor of a particular one of the respective camera-groups in an orientation to reduce angular separation between the nominal heading and one of a projected pixel column and a projected pixel row of the particular electronic image sensor below a pre-determined separation threshold.

EC8) The method of EC7, wherein the pre-determined separation threshold is 30 degrees.

EC9) The method of EC7, wherein the configuring comprises rotating the particular electronic image sensor around an optical axis of a camera of the particular camera-group.

EC10) The method of EC1, wherein the vehicle further comprises at least one nadir camera-group enabled to capture nadir imagery.

EC11) The method of EC10, wherein a sensor field of view within the nadir camera-group overlaps a sensor field of view within at least one of the respective camera-groups.

EC12) The method of EC1, wherein the vehicle is one or more of an aircraft, an airplane, a lighter-than-air craft, a space-craft, a helicopter, a satellite, a car, a truck, a land-based vehicle, a ship, a boat, a barge, a canoe, a submersible, and a submarine.

EC13) The method of EC12, wherein the vehicle is unmanned or manned.

EC14) The method of EC1, wherein at least one electronic image sensor of the respective camera-groups is enabled to capture infrared radiation.

EC15) The method of EC1, wherein at least one of the respective camera-groups comprises an electronic image sensor.

EC16) The method of EC1, wherein at least one camera of the respective camera-groups comprises at least one partially reflective element and a plurality of Petzval surfaces.

EC17) The method of EC1, wherein at least one camera of the respective camera-groups comprises a staggered array of electronic image sensors at a Petzval surface or a butted array of electronic image sensors at a Petzval surface.

EC18) The method of EC1, wherein at least one of the respective camera-groups comprises a plurality of cameras with parallel or nearly parallel lenses, each camera comprising an array of electronic image sensors at its Petzval surface(s), such that projected fields of view of the electronic image sensors overlap.

EC19) The method of EC1, wherein a Petzval surface for at least one camera of the respective camera-groups comprises at least two area-format electronic image sensors or at least two line-format electronic image sensors.

EC20) The method of EC1, wherein the cardinal direction is a true cardinal direction or a magnetic cardinal direction.

EC21) The method of EC1, wherein the respective camera-groups comprise N particular camera-groups and the pre-determined angular offset is between 300/(2*N) and 420/(2*N) degrees.

EC22) The method of EC1, wherein the capturing oblique imagery comprises capturing a plurality of images from at least a first one of the respective camera-groups.

EC23) The method of EC22, wherein the plurality of images are captured sequentially in a strip.

EC24) The method of EC23, wherein the plurality of images comprises first, second, and third contiguously obtained images, the second image overlaps by at least 50% with the first image, and overlaps by at least 50% with the third image.

EC25) The method of EC23, wherein the plurality of images is a first plurality of images, the strip is a first strip, the capturing oblique imagery further comprises capturing a second plurality of images from at least a second one of the respective camera-groups as a second strip, and the first strip and the second strip overlap with each other.

EC26) The method of EC25, wherein the first strip is captured at a first period in time, the second strip is captured at a second period in time, and the first period in time is distinct from the second period in time.

EC27) The method of EC25, wherein a first image in the first strip overlaps with a second image in the second strip, the first image is captured at a first period in time, the second image is captured at a second period in time, and the first period in time is distinct from the second period in time.

EC28) The method of EC10, wherein the capturing oblique imagery comprises capturing a first plurality of images from at least a first one of the respective camera-groups and a second plurality of images from at least one camera of the nadir camera-group.

EC29) The method of EC28, wherein the first plurality of images is captured sequentially in a first image strip and the second plurality of images is captured sequentially in a second image strip.

EC30) The method of EC29, wherein the first image strip and the second image strip overlap.

EC31) The method of EC30, wherein a first image in the first image strip overlaps with a second image in the second image strip, the first image is captured at a first period in time, the second image is captured at a second period in time, and the first period in time is distinct from the second period in time.

EC32) The method of EC1, wherein the capturing is performed by all of the respective camera-groups.

EC33) A method comprising operating a vehicle comprising one or more respective camera-groups enabled to capture oblique imagery via a distortion correcting electronic image sensor.

EC34) The method of EC33, wherein the distortion correcting electronic image sensor reduces angular separation between one of projected pixel rows and projected pixel columns of the distortion correcting electronic image sensor and a pre-determined direction on the ground below a pre-determined separation threshold.

EC35) The method of EC34, wherein the pre-determined direction on the ground is a cardinal or intercardinal direction.

EC36) The method of EC34, wherein the pre-determined direction on the ground is a nominal heading.

EC37) The method of EC34, wherein the pre-determined separation threshold is 30 degrees.

EC38) The method of EC34, wherein the respective camera-groups are enabled to capture oblique imagery through a medium other than air.

EC39) The method of EC38, wherein the distortion correcting electronic image sensor reduces distortions introduced at least in part by the medium, changes in the medium, or interfaces to the medium.

EC40) The method of EC38, wherein the medium is one or more of water, oil, and vacuum.

EC41) The method of EC33, wherein the distortion correcting electronic image sensor comprises an electronic image sensor element with a non-zero twist angle.

EC42) The method of EC33, wherein the distortion correcting electronic image sensor comprises a group of electronic image sensor elements and each electronic image sensor element has an individual non-zero twist angle.

EC43) The method of EC33, wherein the distortion correcting electronic image sensor comprises an electronic image sensor element with a non-uniform array of pixels.

EC44) The method of EC33, wherein the operating further comprises configuring each of the respective camera-groups with a respective pre-determined plan angle range.

EC45) The method of EC44, wherein at least one of the respective pre-determined plan angle ranges includes an angle more than zero degrees and less than 90 degrees.

EC46) The method of EC45, wherein the angle is approximately 45 degrees.

EC47) The method of EC45, wherein the operating is in accordance with a nominal heading of the vehicle corresponding to a cardinal direction.

EC48) The method of EC45, wherein the operating is in accordance with a nominal heading of the vehicle corresponding to an intercardinal direction.

EC49) The method of EC33, wherein the operating further comprises establishing a nominal heading corresponding to a cardinal direction plus a pre-determined angular offset between 10 and 80 degrees, and capturing oblique imagery with at least one camera of the respective camera-groups.

EC50) The method of EC33, wherein at least one of the respective camera-groups consists of a single camera.

EC51) The method of EC33, wherein at least one of the respective camera-groups comprises multiple cameras.

EC52) The method of EC33, wherein the respective camera-groups comprise N particular camera-groups, each of the N particular camera-groups is associated with a unique integer K between 0 and (N−1) inclusive, and a respective pre-determined plan angle range of the particular camera-group is (180+360*K)/N degrees plus a pre-determined angular offset range.

EC53) The method of EC52, wherein the pre-determined angular offset range is between minus 120/N and plus 120/N degrees.

EC54) The method of EC53, wherein N is four or eight.

EC55) The method of EC33, wherein the vehicle further comprises at least one nadir camera-group enabled to capture nadir imagery.

EC56) The method of EC55, wherein a sensor field of view within the nadir camera-group overlaps a sensor field of view within at least one of the respective camera-groups.

EC57) The method of EC33, wherein the vehicle is one or more of an aircraft, an airplane, a lighter-than-air craft, a space-craft, a helicopter, a satellite, a car, a truck, a land-based vehicle, a ship, a boat, a barge, a canoe, a submersible, and a submarine.

EC58) The method of EC57, wherein the vehicle is unmanned or manned.

EC59) The method of EC33, wherein at least one electronic image sensor element of the respective camera-groups is enabled to capture infrared radiation.

EC60) The method of EC33, wherein at least one of the respective camera-groups comprises an electronic image sensor element.

EC61) The method of EC33, wherein at least one camera of the respective camera-groups comprises at least one partially reflective element and a plurality of Petzval surfaces.

EC62) The method of EC33, wherein at least one camera of the respective camera-groups comprises a staggered array of electronic image sensor elements at a Petzval surface or a butted array of electronic image sensor elements at a Petzval surface.

EC63) The method of EC33, wherein at least one of the respective camera-groups comprises a plurality of cameras with parallel or nearly parallel lenses, each camera comprising an array of electronic image sensor elements at its Petzval surface(s), such that projected fields of view of the electronic image sensor elements overlap.

EC64) The method of EC33, wherein a Petzval surface for at least one camera of the respective camera-groups comprises at least two area-format electronic image sensor elements or at least two line-format electronic image sensor elements.

EC65) The method of EC49, wherein the cardinal direction is a true cardinal direction or a magnetic cardinal direction.

EC66) The method of EC49, wherein the respective camera-groups comprise N particular camera-groups and the pre-determined angular offset is between 300/(2*N) and 420/(2*N) degrees.

EC67) The method of EC49, wherein the capturing oblique imagery comprises capturing a plurality of images from at least a first one of the respective camera-groups.

EC68) The method of EC67, wherein the plurality of images are captured sequentially in a strip.

EC69) The method of EC68, wherein the plurality of images comprises first, second, and third images that are contiguously obtained, the second image overlaps by at least 50% with the first image, and overlaps by at least 50% with the third image.

EC70) The method of EC68, wherein the plurality of images is a first plurality of images, the strip is a first strip, the capturing oblique imagery further comprises capturing a second plurality of images from at least a second one of the respective camera-groups as a second strip, and the first strip and the second strip overlap with each other.

EC71) The method of EC70, wherein the first strip is captured at a first period in time, the second strip is captured at a second period in time, and the first period in time is distinct from the second period in time.

EC72) The method of EC70, wherein a first image in the first strip overlaps with a second image in the second strip, the first image is captured at a first period in time, the second image is captured at a second period in time, and the first period in time is distinct from the second period in time.

EC73) The method of EC55, wherein the vehicle further comprises at least one nadir camera-group enabled to capture nadir imagery and the capturing oblique imagery comprises capturing a first plurality of images from at least a first one of the respective camera-groups and a second plurality of images from at least one camera of the nadir camera-group.

EC74) The method of EC73, wherein the first plurality of images is captured sequentially in a first image strip and the second plurality of images is captured sequentially in a second image strip.

EC75) The method of EC74, wherein the first and the second image strips overlap.

EC76) The method of EC75, wherein a first image in the first image strip overlaps with a second image in the second strip, the first image is captured at a first period in time, the second image is captured at a second period in time, and the first period in time is distinct from the second period in time.

EC77) The method of EC49, wherein the capturing is performed by all of the respective camera-groups.

EC78) A method comprising:
operating a vehicle comprising one or more respective camera-groups enabled to capture oblique imagery via electronic image sensor technology;
configuring each of the respective camera-groups with a respective pre-determined plan angle range;
establishing a nominal heading as corresponding to a cardinal direction plus a pre-determined angular offset between 10 and 80 degrees; and
capturing oblique imagery in some cardinal direction with at least one camera of the respective camera-groups.

EC79) The method of EC78, wherein the respective camera-groups comprise N particular camera-groups, each of the N particular camera-groups is associated with a unique integer K between 0 and (N−1) inclusive, and the respective pre-determined plan angle range of the particular camera-group is (180+360*K)/N degrees plus a pre-determined angular offset range.

EC80) The method of EC78, further comprising configuring a particular electronic image sensor of a particular one of the respective camera-groups in an orientation to reduce angular separation between the nominal heading and one of a projected pixel column and a projected pixel row of the particular electronic image sensor below a pre-determined separation threshold.

EC81) The method of EC80, wherein the configuring the particular electronic image sensor comprises rotating the particular electronic image sensor around an optical axis of a camera of the particular camera-group.

EC82) The method of EC78, wherein the vehicle further comprises at least one nadir camera-group enabled to capture nadir imagery.

EC83) The method of EC78, wherein the capturing oblique imagery comprises capturing a plurality of images from at least a first one of the respective camera-groups.

EC84) The method of EC83, wherein the plurality of images are captured sequentially in a strip.

EC85) The method of EC84, wherein the plurality of images comprises first, second, and third contiguously obtained images, the second image overlaps by at least 50% with the first image, and overlaps by at least 50% with the third image.

EC86) The method of EC84, wherein the plurality of images is a first plurality of images, the strip is a first strip, the capturing oblique imagery further comprises capturing a second plurality of images from at least a second one of respective camera-groups as a second strip, and the first strip and the second strip overlap with each other.

EC87) A method comprising:
operating a vehicle comprising one or more respective camera-groups enabled to capture oblique imagery via a distortion correcting electronic image sensor.

EC88) The method of EC87, wherein the distortion correcting electronic image sensor reduces angular separation between one of projected pixel rows and projected pixel columns of the distortion correcting electronic image sensor and a pre-determined direction on the ground below a pre-determined separation threshold.

EC89) The method of EC88, wherein the pre-determined direction on the ground is a nominal heading of the vehicle.

EC90) The method of EC87, wherein the distortion correcting electronic image sensor comprises an electronic image sensor element with a non-zero twist angle.

EC91) The method of EC87, wherein the distortion correcting electronic image sensor comprises a group of electronic image sensor elements and each electronic image sensor element has an individual non-zero twist angle.

EC92) The method of EC87, wherein the operating further comprises configuring each of the respective camera-groups with a respective pre-determined plan angle range.

EC93) The method of EC87, wherein the operating further comprises establishing a nominal heading corresponding to a cardinal direction plus a pre-determined angular offset between 10 and 80 degrees, and the operating further comprises capturing oblique imagery with at least one camera of the respective camera-groups.

EC94) The method of EC93, wherein the capturing oblique imagery comprises capturing a plurality of images from at least a first one of the respective camera-groups.

EC95) The method of EC94, wherein the plurality of images are captured sequentially in a strip.

EC96) The method of EC95, wherein the plurality of images comprises first, second, and third contiguously obtained images, the second image overlaps by at least 50% with the first image, and overlaps by at least 50% with the third image.

EC97) The method of EC95, wherein the plurality of images is a first plurality of images, the strip is a first strip of images, the capturing oblique imagery further comprises capturing a second plurality of images from at least a second one of respective camera-groups as a second strip, and the first strip and the second strip overlap with each other.

EC98) The method of EC97, wherein a first image in the first image strip overlaps with a second image in the second strip and the first image is captured at a first period in time and the second image is captured at a second period in time and the first period in time is distinct from the second period in time.

EC99) The method of EC87, wherein the respective camera-groups comprise N particular camera-groups, each of the N particular camera-groups is associated with a unique integer K between 0 and (N−1) inclusive, and a respective pre-determined plan angle range of the particular camera-group is (180+360*K)/N degrees plus a pre-determined angular offset range.

EC100) The method of EC87, wherein the vehicle further comprises at least one nadir camera-group enabled to capture nadir imagery.

EC101) A system comprising:
means for operating a vehicle comprising one or more respective camera-groups enabled to capture oblique imagery via electronic image sensor technology;
means for configuring each of the respective camera-groups with a respective pre-determined plan angle range;
means for establishing a nominal heading of the vehicle as corresponding to a cardinal direction plus a pre-determined angular offset between 10 and 80 degrees; and
means for capturing oblique imagery in some cardinal direction with at least one camera of the respective camera-groups.

EC102) The system of EC101, wherein the respective camera-groups comprise N particular camera-groups, each of the N particular camera-groups is associated with a unique integer K between 0 and (N−1) inclusive, and the respective pre-determined plan angle range of the particular camera-group is (180+360*K)/N degrees plus a pre-determined angular offset range.

EC103) The system of EC101, further comprising means for configuring a particular electronic image sensor of a particular one of the respective camera-groups in an orientation to reduce angular separation between the nominal heading and one of a projected pixel column and a projected pixel row of the particular electronic image sensor below a pre-determined separation threshold.

EC104) The system of EC103, wherein the means for configuring comprises means for rotating the particular electronic image sensor around an optical axis of a camera of the particular camera-group.

EC105) The system of EC101, wherein the vehicle further comprises at least one nadir camera-group enabled to capture nadir imagery.

EC106) The system of EC101, wherein the means for capturing oblique imagery comprises means for capturing a plurality of images from at least a first one of the respective camera-groups.

EC107) The system of EC106, wherein the plurality of images are captured sequentially in a strip.

EC108) The system of EC107, wherein the plurality of images comprises first, second, and third contiguously obtained images, the second image overlaps by at least 50% with the first image, and overlaps by at least 50% with the third image.

EC109) The system of EC107, wherein the plurality of images is a first plurality of image, the strip is a first strip, the means for capturing oblique imagery further comprises means for capturing a second plurality of images from at least a second one of the respective camera-groups as a second strip, and the first strip and the second strip overlap with each other.

EC110) A system comprising:
means for operating a vehicle comprising one or more respective camera-groups enabled to capture oblique imagery via a distortion correcting electronic image sensor.

EC111) The system of EC110, wherein the distortion correcting electronic image sensor reduces angular separation between one of projected pixel rows and projected pixel columns of the distortion correcting electronic image sensor and a pre-determined direction on the ground below a pre-determined separation threshold.

EC112) The system of EC111, wherein the pre-determined direction on the ground is a nominal heading.

EC113) The system of EC110, wherein the distortion correcting electronic image sensor comprises an electronic image sensor element with a non-zero twist angle.

EC114) The system of EC110, wherein the distortion correcting electronic image sensor comprises a group of electronic image sensor elements and each electronic image sensor element has an individual non-zero twist angle.

EC115) The system of EC110, wherein the means for operating further comprises means for configuring each of the respective camera-groups with a respective pre-determined plan angle range.

EC116) The system of EC110, wherein the means for operating further comprises means for establishing a nominal heading corresponding to a cardinal direction plus a pre-determined angular offset between 10 and 80 degrees, and the means for operating further comprise means for capturing oblique imagery with at least one camera of the respective camera-groups.

EC117) The system of EC116, wherein the means for capturing oblique imagery comprises means for capturing a plurality of images from at least a first one of the respective camera-groups.

EC118) The system of EC117, wherein the plurality of images are captured sequentially in a strip.

EC119) The system of EC118, wherein the plurality of images comprises first, second, and third contiguously obtained images, the second image overlaps by at least 50% with the first image, and overlaps by at least 50% with the third image.

EC120) The system of EC118, wherein the strip is a first strip, the means for capturing oblique imagery further comprises means for capturing a plurality of images from at least a second one of the respective camera-groups as a second strip, and the first strip and the second strip overlap with each other.

EC121) The system of EC120, wherein a first image in the first strip overlaps with a second image in the second strip, the first image is captured at a first period in time, the second image is captured at a second period in time, and the first period in time is distinct from the second period in time.

EC122) The system of EC110, wherein the respective camera-groups comprise N particular camera-groups, each of the N particular camera-groups is associated with a unique integer K between 0 and (N−1) inclusive, and a respective pre-determined plan angle range of the particular camera-group is (180+360*K)/N degrees plus a pre-determined angular offset range.

EC123) The system of EC110, wherein the vehicle further comprises at least one nadir camera-group enabled to capture nadir imagery.

EC124) An apparatus comprising:
a vehicle comprising one or more respective camera-groups enabled to capture oblique imagery via electronic image sensor technology;
a camera mount assembly enabled to configure each of the respective camera-groups with a respective pre-determined plan angle range;
a navigation sub-system enabled to establish a nominal heading of the vehicle as corresponding to a cardinal direction plus a pre-determined angular offset between 10 and 80 degrees; and
an image capture sub-system enabled to capture oblique imagery in some cardinal direction with at least one camera of the respective camera-groups.

EC125) The apparatus of EC124, wherein the respective camera-groups comprise N particular camera-groups, each of the N particular camera-groups is associated with a unique integer K between 0 and (N−1) inclusive, and the respective pre-determined plan angle range of the particular camera-group is (180+360*K)/N degrees plus a pre-determined angular offset range.

EC126) The apparatus of EC124, further comprising a sensor mount assembly enabled to configure a particular electronic image sensor of a particular one of the respective camera-groups in an orientation to reduce angular separation between the nominal heading and one of a projected pixel column and a projected pixel row of the particular electronic image sensor below a pre-determined separation threshold.

EC127) The apparatus of EC126, wherein the sensor mount assembly comprises a sensor rotation assembly enabled to rotate the particular electronic image sensor around an optical axis of a camera of the particular camera-group.

EC128) The apparatus of EC124, wherein the vehicle further comprises at least one nadir camera-group enabled to capture nadir imagery.

EC129) The apparatus of EC124, wherein the image capture sub-system is enabled to capture a plurality of images from at least a first one of the respective camera-groups.

EC130) The apparatus of EC129, wherein the image capture sub-system comprises an image strip capture sub-system enabled to capture the plurality of images sequentially in a strip.

EC131) The apparatus of EC130, wherein the plurality of images comprises first, second, and third contiguously obtained images, the second image overlaps by at least 50% with the first image, and overlaps by at least 50% with the third image.

EC132) The apparatus of EC130, wherein the plurality of images is a first plurality of images, the strip is a first strip, the image strip capture sub-system is further enabled to capture second a plurality of images from at least a second one of the respective camera-groups as a second strip, and the first strip and the second strip overlap with each other.

EC133) An apparatus comprising:
a vehicle comprising one or more respective camera-groups enabled to capture oblique imagery via a distortion correcting electronic image sensor.

EC134) The apparatus of EC133, wherein the distortion correcting electronic image sensor reduces angular separation between one of projected pixel rows and projected pixel columns of the distortion correcting electronic image sensor and a pre-determined direction on the ground below a pre-determined separation threshold.

EC135) The apparatus of EC134, wherein the pre-determined direction on the ground is a nominal heading.

EC136) The apparatus of EC133, wherein the distortion correcting electronic image sensor comprises an electronic image sensor element with a non-zero twist angle.

EC137) The apparatus of EC133, wherein the distortion correcting electronic image sensor comprises a group of electronic image sensor elements and each electronic image sensor element has an individual non-zero twist angle.

EC138) The apparatus of EC133, wherein the vehicle further comprises a camera mount assembly enabled to configure each of the respective camera-groups with a respective pre-determined plan angle range.

EC139) The apparatus of EC133, wherein the vehicle further comprises a navigation sub-system enabled to establish a nominal heading corresponding to a cardinal direction plus a pre-determined angular offset between 10 and 80 degrees, and the vehicle further comprises an image capture sub-system enabled to capture oblique imagery with at least one camera of the respective camera-groups.

EC140) The apparatus of EC139, wherein the image capture sub-system is enabled to capture a plurality of images from at least a first one of the respective camera-groups.

EC141) The apparatus of EC140, wherein the image capture sub-system comprises an image strip capture sub-system enabled to capture the plurality of images sequentially in a strip.

EC142) The apparatus of EC141, wherein the plurality of images comprises first, second, and third contiguously obtained images, the second image overlaps by at least 50% with the first image, and overlaps by at least 50% with the third image.

EC143) The apparatus of EC141, wherein the plurality of images is a first plurality of images, the strip is a first strip, the image strip capture sub-system is further enabled to capture a second plurality of images from at least a second one of the respective camera-groups as a second strip, and the first strip and the second strip overlap with each other.

EC144) The apparatus of EC143, wherein a first image in the first strip overlaps with a second image in the second strip, the first image is captured at a first period in time, the second image is captured at a second period in time, and the first period in time is distinct from the second period in time.

EC145) The apparatus of EC133, wherein the respective camera-groups comprise N particular camera-groups, each of the N particular camera-groups is associated with a unique integer K between 0 and (N−1) inclusive, and a respective pre-determined plan angle range of the particular camera-group is (180+360*K)/N degrees plus a pre-determined angular offset range.

EC146) The apparatus of EC133, wherein the vehicle further comprises at least one nadir camera-group enabled to capture nadir imagery.

EC147) A method comprising:
operating a vehicle comprising one or more respective camera-groups each enabled to capture oblique imagery via electronic image sensor technology;
configuring each of the respective camera-groups with a respective pre-determined plan angle range that is any acute angle modulo 90 degrees;
flying a flight plan comprising two or more flight line segments over a collection area and capturing oblique imagery with at least one camera of the respective camera-groups; and
wherein each of the respective camera-groups comprise at least one electronic image sensor.

EC148) A method comprising:
operating a vehicle comprising one or more respective camera-groups each enabled to capture oblique imagery via electronic image sensor technology;
configuring each of the respective camera-groups with a respective pre-determined plan angle range that is between 15 and 75 degrees modulo 90 degrees;
flying a flight plan comprising two or more flight line segments over a collection area and capturing oblique imagery with at least one camera of the respective camera-groups; and
wherein each of the respective camera-groups comprise at least one electronic image sensor.

EC149) The method of EC147 or EC148, wherein a first one of the respective camera-groups is configured with a respective pre-determined plan angle range that is between 15 and 75 degrees, and a second one of the respective camera-groups is configured with a respective pre-determined plan angle range that is between 105 and 165 degrees.

EC150) The method of EC149, wherein a third one of the respective camera-groups is configured with a respective pre-determined plan angle range that is between 195 and 255 degrees, and a fourth one of the respective camera-groups is configured with a respective pre-determined plan angle range that is between 285 and 345 degrees.

EC151) The method of EC150, wherein at least one of the two or more flight line segments is nominally parallel to a longest axis of the collection area.

EC152) The method of EC151, wherein at least two of the two or more flight line segments are nominally parallel to the longest axis.

EC153) The method of EC152, wherein at least the at least one camera comprises one or more distortion correcting electronic image sensors.

EC154) The method of EC153, wherein at least one of the distortion correcting electronic image sensors is configured in accordance with a twist angle, and the twist angle is in accordance with any one or more of a down angle of the at least one camera and position of the at least one distortion correcting electronic image sensors within a field of a lens of the at least one camera.

EC155) The method of EC154, wherein at least one of the respective pre-determined plan angle ranges is pre-determined based at least in part on a desired swath.

EC156) The method of EC155, wherein the flight plan is determined at least in part programmatically based at least in part on the at least one of the respective pre-determined plan angle ranges.

EC157) The method of EC156, wherein a 3D model of at least a portion of the collection area is formulated at least in part based on all or any portions of image data collected via the at least one electronic image sensor.

System and Operation

Figure 2:
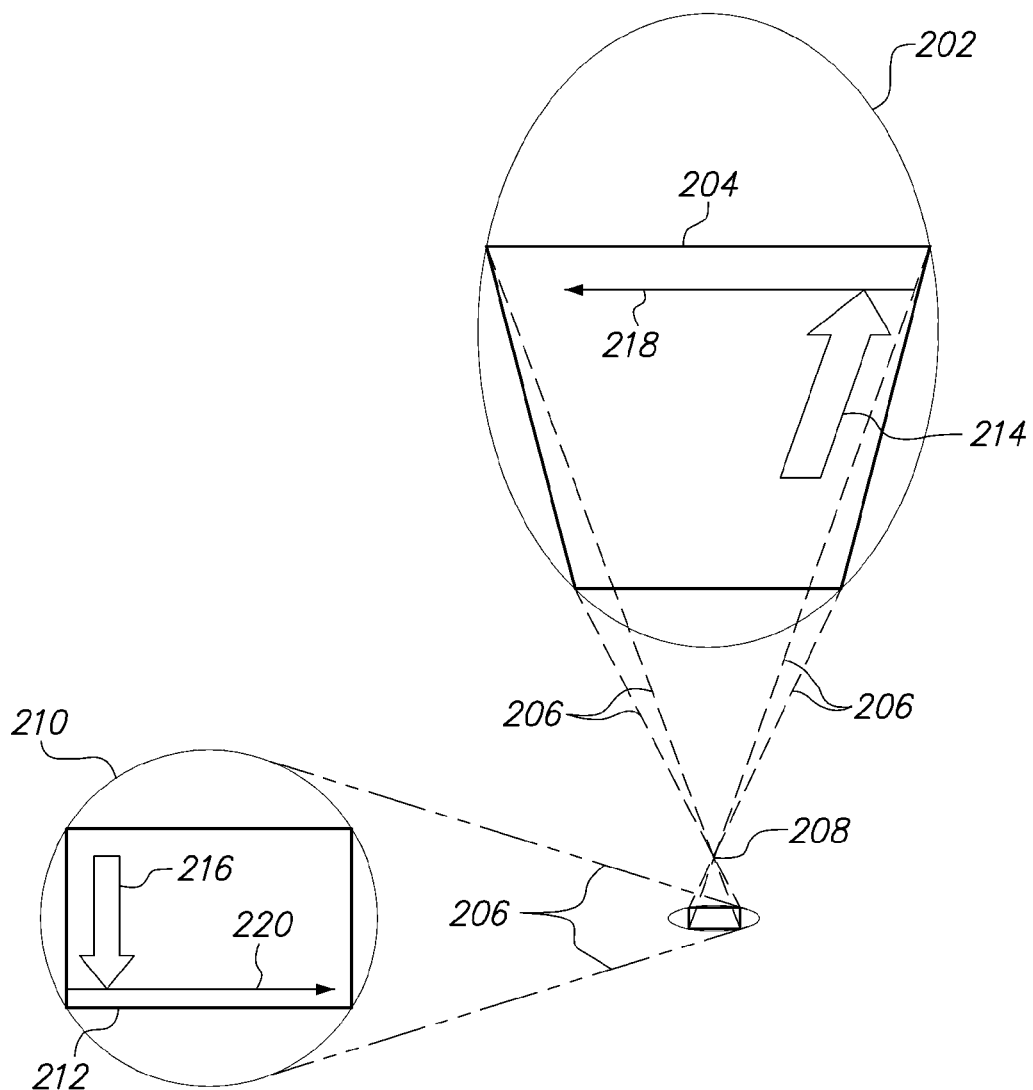
FIG. 2 conceptually illustrates a plan view of selected prior art details of the field of view of a single example camera of a Maltese Cross camera-set.
Figure 5:
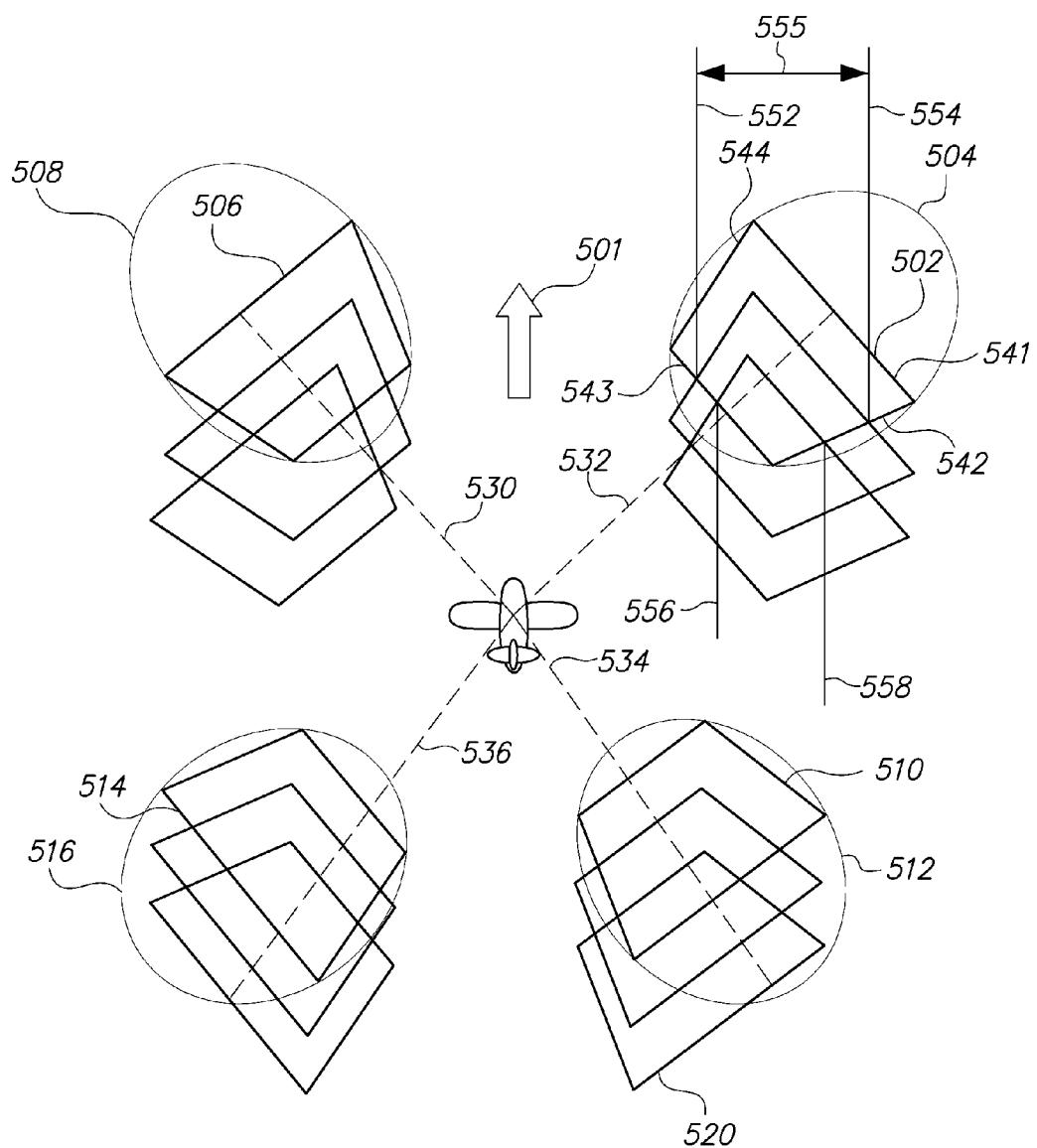
FIG. 5 conceptually illustrates a plan view of selected details of an embodiment of capturing oblique imagery via a camera-set with emerging optical axes rotated in plan.

FIG. 5 conceptually illustrates a plan view of selected details of an embodiment of capturing oblique imagery via a camera-set with emerging optical axes rotated in plan. For clarity of exposition, the cameras are conceptually identical to the one shown in FIGS. 2 and 3 (e.g., same altitude, same down angle, focal length and image sensor size). In various embodiments, the nominal heading of vehicle 501 is an intercardinal direction (e.g., NW, NE, SW, SE). In some other embodiments, the nominal heading of the vehicle is a cardinal direction (e.g., North, South, East, West). In some embodiments, the camera-set includes four oblique cameras, with diagonal emerging optical axes 530, 532, 534, 536. In various embodiments, the camera-set optionally includes an arbitrary number of cameras or camera-groups, e.g., two, three, four, or eight. The emerging optical axes of the cameras are rotated with respect to the nominal heading. In some embodiments, there are four cameras with plan angles of approximately 45, 135, 225 and 315 degrees. Note that if the nominal heading of the vehicle is an intercardinal direction and the cameras have plan angles of approximately 45, 135, 225 and 315 degrees, then the cameras capture oblique imagery from perspectives that are cardinal directions. Similarly, if the nominal heading of the vehicle is a cardinal direction and the cameras have plan angles of approximately 45, 135, 225 and 315 degrees, then the cameras capture oblique imagery from perspectives that are intercardinal directions.

The projected field of view of each camera lens 504, 508, 512, 516 is an ellipse that contains the respective projected sensor FOV 502, 506, 510, 514, which is a trapezoid inscribed in the ellipse. The shape of the camera lens' projected FOV and sensor FOV are due to the down and plan angles of the cameras. An example sensor FOV has a long base 541, a right leg 542, a short base 543 and a left leg 544 and an exposure of the camera captures the interior of the sensor FOV. Additional captured images of the projected FOV trapezoids are shown, e.g., 520.

In some embodiments, adjacent strips of the ground are captured during adjacent flight lines. To stitch these strips together, portions of the strips are discarded (e.g., jagged edges) to ensure a smooth fit. The non-discarded portions are sometimes called the useful strip. The useful strip of ground captured by the camera corresponding to emerging optical axis 532 is between boundaries 552 and 554. The swath of the strip (e.g., width of the strip) is less than the shorter base of the trapezoid, due to the spacing between each captured image. To do stereopsis on the captured images, each ground point is captured by two consecutive images. The swath of ground captured by two successive images is between boundaries 556 and 558. A wide swath with stereopsis overlap in a rotated configuration uses cameras having a relatively high frame rate (e.g., frame spacing less than one fifth of the swath). As the frame rate gets higher and the stereopsis swath wider, the stereopsis baseline (length of camera translation between successive images) gets smaller, and thus the accuracy of depth perception by stereopsis gets worse.

For a rotated oblique camera the width of the swath (e.g., 555) is closely related to the frame pitch (e.g., the distance between the centers of successive frames along the nominal heading, which is determined by flight speed and image sensor frame rate), the down angle, and the difference between the plan angle (e.g., 532) and the nominal heading (e.g., 501). In some scenarios, a rotated oblique camera has a swath that is approximately 21% wider than the same oblique camera that is parallel to the nominal heading. Note that the increase in swath is independent of the nominal heading. The increase in swath from the rotated oblique camera is potentially limited by the frame pitch. For a rotated oblique camera, relatively smaller frame pitches result in relatively larger increases in swath (relative to a Maltese-cross oblique camera); while relatively larger frame pitches result in relatively smaller increases in swath and can potentially decrease the width of the swath.

Figure 3:
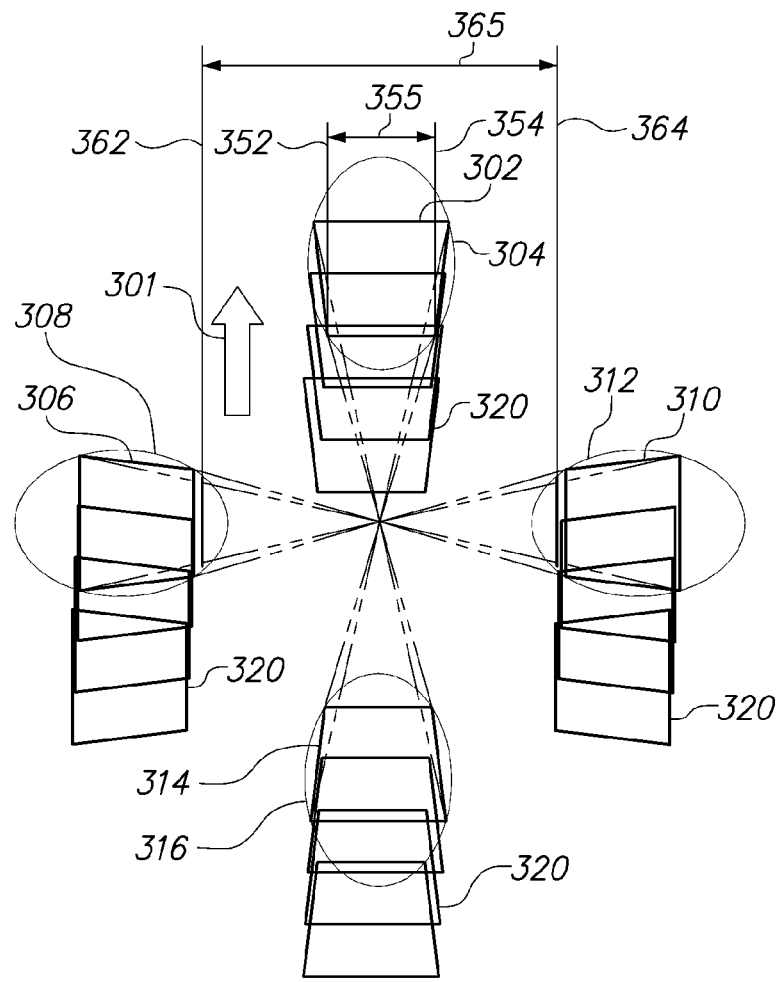
FIG. 3 conceptually illustrates a plan view of selected prior art details of capturing oblique imagery via a Maltese Cross camera-set.
Figure 4:
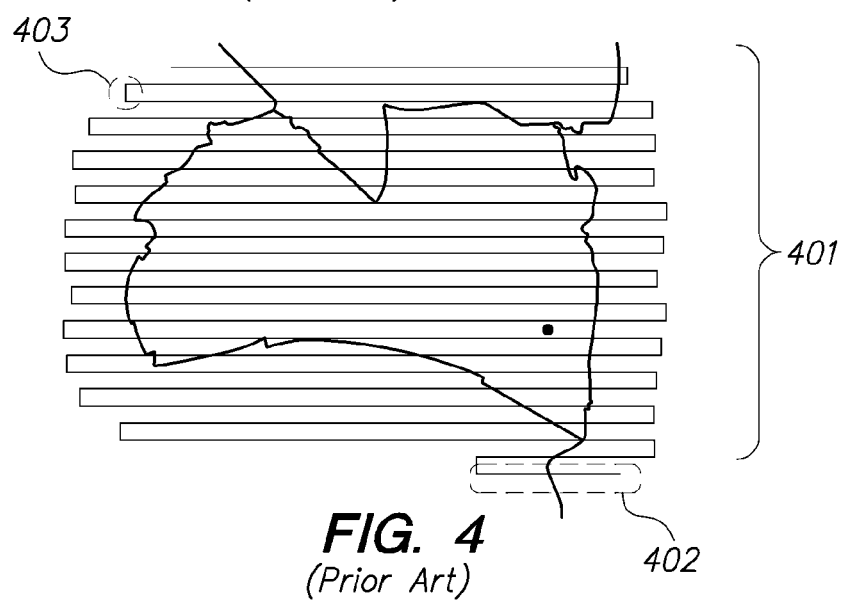
FIG. 4 conceptually illustrates selected prior art details of an example flight plan for capturing oblique imagery covering Alexandria County, Va., using the Maltese Cross camera-set of FIG. 3.

The collection swath of a camera must fit within the projected FOV ellipses. In FIG. 3, the forward and back swaths are constrained by the minor axis of the front and back FOV ellipses; the side-facing swaths are constrained by the major axis of the side-facing FOV ellipses, which are significantly larger. In the example of FIG. 3, the sensor FOVs of the left and right cameras are 487 meters wide, and the sensor FOVs of the front and back cameras are 458 meters wide (distance 355).

In various embodiments, the swaths for all four cameras are equal, which in some scenarios is an advantage compared to the camera configuration shown in FIG. 3. For example, the swath of the camera with emerging optical axis 532 is bounded by inner edge 552 and outer edge 554. In an example in the context of FIG. 5 with frame pitch of 100 meters, swath 555 is 510 meters wide, which is approximately 11% wider than the minimum swath of an example in the context of FIG. 3. The FOVs for cameras on different sides of the vehicle are also spaced closer together. In some embodiments, the larger swath enables the flight lines of the vehicle to be more broadly spaced, reducing the total number of flight lines and total distance traveled by the vehicle, which directly reduces the cost of collecting the oblique imagery. In some embodiments, another advantage of more broadly spaced flight lines is that the vehicle speed during turns can be faster, so that less time is spent decelerating and accelerating before and after turns.

Figure 6:
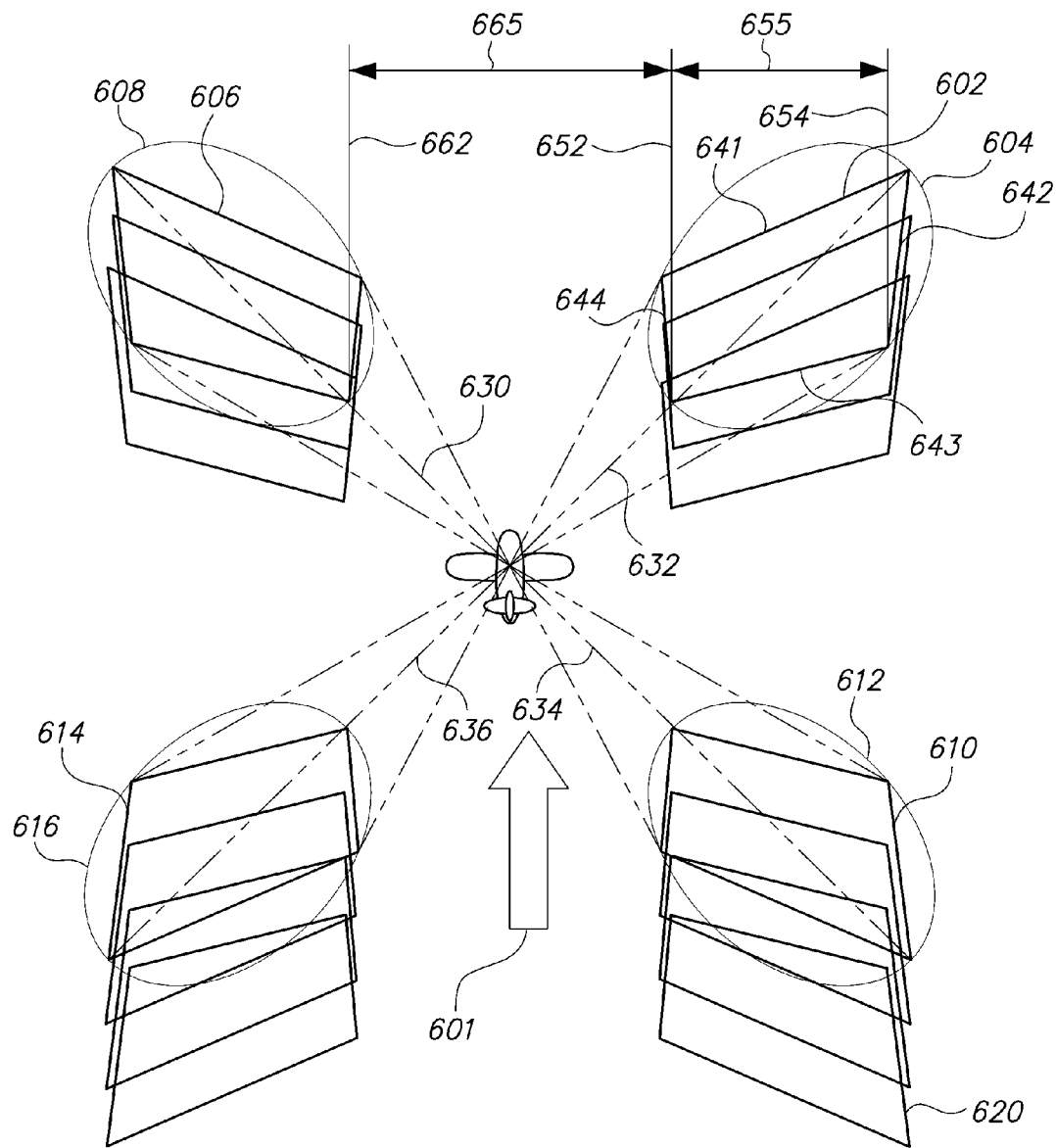
FIG. 6 conceptually illustrates a plan view of selected details of an embodiment of capturing oblique imagery via a camera-set with rotated emerging optical axes and distortion correcting sensors.

FIG. 6 conceptually illustrates a plan view of selected details of an embodiment of capturing oblique imagery via a camera-set with diagonal emerging optical axes (e.g., plan angles of approximately 45, 135, 225 and 315 degrees) and distortion correcting sensors. The cameras are conceptually identical to the camera illustrated in FIGS. 2, 3, and 5 (e.g., same altitude, same down angle, focal length and image sensor size, and same plan angles as in FIG. 5). However, the image sensors in the cameras of FIG. 6 correct for the distortion caused by projection onto the ground. The distortion correcting sensor in FIG. 6 is a twisted sensor. The image sensor is rotated around the optical axes of the respective cameras, so that the projected central pixel columns (or pixel rows) of the sensor are approximately aligned to a desired direction on the ground (e.g., nominal heading of the vehicle or a cardinal direction).

A second example of a distortion correcting sensor is a sensor with a non-uniform pixel array. The pixel array is distorted such that the projected pixel columns (or pixel rows) of the sensor are approximately aligned to a desired direction on the ground (e.g., nominal heading of the vehicle or a cardinal direction).

In various embodiments, the nominal heading of the vehicle 601 is an intercardinal direction (e.g., NW, NE, SW, SE). In some other embodiments, the nominal heading of the vehicle is a cardinal direction (e.g., North, South, East, West) or an arbitrary direction. The projected field of view of each camera lens 604, 608, 612, 616 is an ellipse that contains the respective projected sensor FOVs 602, 606, 610, 614, each a trapezium inscribed in the ellipse. The shape of the camera's projected FOV and sensor FOV are due to the down and plan angles of the cameras and the rotation of the sensor around the optical axis of the camera. An example sensor FOV has a long base 641, a right leg 642, a short base 643 and a left leg 644 and an exposure of the camera captures the interior of the sensor FOV. Additional captured images of the projected FOV trapeziums are shown, e.g., 620. Note that if the nominal heading of the vehicle is an intercardinal direction and the cameras have plan angles of approximately 45, 135, 225 and 315 degrees, then the cameras capture oblique imagery from perspectives that are cardinal directions. Similarly, if the nominal heading of the vehicle is a cardinal direction and the cameras have plan angles of approximately 45, 135, 225 and 315 degrees, then the cameras capture oblique imagery from perspectives that are intercardinal directions.

For an oblique camera with distortion correcting sensors, the width of the swath (e.g., 655) is closely related to the down angle, and the difference between the plan angle (e.g., 632) and the nominal heading (e.g., 601). In some scenarios, a rotated oblique camera with distortion correcting sensors has a swath that is approximately 30% wider than the same oblique camera that is parallel to the nominal heading. Note that the increase in swath is independent of the nominal heading. Note that using distortion correcting sensors in the oblique camera significantly reduces or eliminates limitations related to frame pitch, compared to the case of an oblique camera without distortion correcting sensors.

In various embodiments, the swaths for all four cameras are equal for any nominal heading. For example, the swath of the camera with emerging optical axis 632 is bounded by inner edge 652 and outer edge 654. The width of the swath is determined by the short base of the trapezium. In the example of FIG. 6, swath 655 is 593 meters wide, which is approximately 30% wider than the minimum swath of the example from FIG. 3. The FOVs for cameras on different sides of the vehicle are also spaced closer together. For example, distance 665 between inner edge 662 of the front-left swath and inner edge 652 of the front-right swath is 898 meters, which is 43% closer together than the example from FIG. 3. In some embodiments, the larger swath enables the flight lines of the vehicle to be more broadly spaced, reducing the total number of flight lines and total distance traveled by the vehicle, which directly reduces the cost of collecting the oblique imagery. In some embodiments, an advantage of more broadly spaced flight lines is that the vehicle speed during turns can be faster, so that less time is spent decelerating and accelerating before and after turns.

Some embodiments have a different number and orientation of the cameras in the camera-set than the conceptual illustration in FIG. 6. Various embodiments have fewer or more cameras (e.g., two, three, four, or eight cameras). Some embodiments have camera orientations that are asymmetric with respect to the nominal heading (e.g., 5 cameras with plan angles of 30, 60, 90, 120, and 150 degrees). In some embodiments, the camera-set includes both cameras with distortion correcting sensors and cameras without distortion correcting sensors (e.g., 8 cameras, four with twisted sensors and plan angles of 45, 135, 225, and 315 degrees, and four with twist angles of zero and plan angles of zero, 90, 180, and 270 degrees).

In some embodiments, an advantage of rotated cameras with distortion correcting sensors is reducing the distance between the vehicle flight line projected to the ground and the inside edge of the oblique swath. As a result, in some embodiments the amount of extra area that is traveled around the edges of a collection area is reduced. When used for collecting small areas (e.g., less than fifty square kilometers for the example altitude, down angle, plan angle, and sensor size from FIG. 6), the reduced distance decreases the cost of collection by a relatively small amount. Additionally, for camera-sets where the nadir camera swath is intended to overlap the oblique swaths, more closely spaced oblique swaths reduce the needed swath of the nadir camera, thereby making the nadir camera less expensive.

In various embodiments, an advantage of rotated cameras with distortion correcting sensors is reducing (e.g., reduced by approximately 35%) the projected ground velocity on the Petzval surface, compared to the side-facing cameras of a Maltese Cross configuration. With a fixed exposure time, a lower projected ground velocity reduces the amount of motion blur and so improves visual quality.

In some embodiments, an advantage of rotated cameras with distortion correcting sensors is improved stereopsis. The swaths captured by the right and left forward rotated cameras are captured a few seconds later by the respective rear rotated cameras, providing large-baseline, small-time-difference stereopsis for both sides of the vehicle. In contrast, a Maltese Cross camera-set only captures a single large-baseline, short-time-difference stereopsis between the forward, rear, and nadir cameras. Greater collection stereopsis enhances the precision of the 3D ground points triangulated from the collected imagery.

In various embodiments, the rotation of the Petzval surface and image sensors cause the average projected pixel size to slightly increase in size, because the more remote portion of the FOV is better utilized. Equivalently, the average down angle of the pixels is slightly smaller.

In some embodiments, a rotated camera with distortion correcting sensors has a wider swath than the equivalent camera in the forward or rear position of a Maltese Cross (e.g., approximately 30% wider), but the same number of cross-track (e.g., perpendicular to the nominal heading) pixels. So the average cross-track Ground Sample Distance (GSD) is larger (e.g., larger by approximately 30%). The average in-track (e.g., parallel to the nominal heading) GSD is smaller (e.g., smaller by 30%), so that the average projected pixel area is only slightly larger (e.g., larger by 5% or less). When the camera pixels are resampled into a North-East-West-South grid with uniform GSD north-south and east-west, the resolution differences between Maltese Cross and the rotated cameras is, in some scenarios, insignificant (e.g., less than 3% linear resolution). The rotated camera's smaller average in-track GSD leads to higher pixel velocity at the Petzval surface (e.g., by about 30%).

Figure 7:
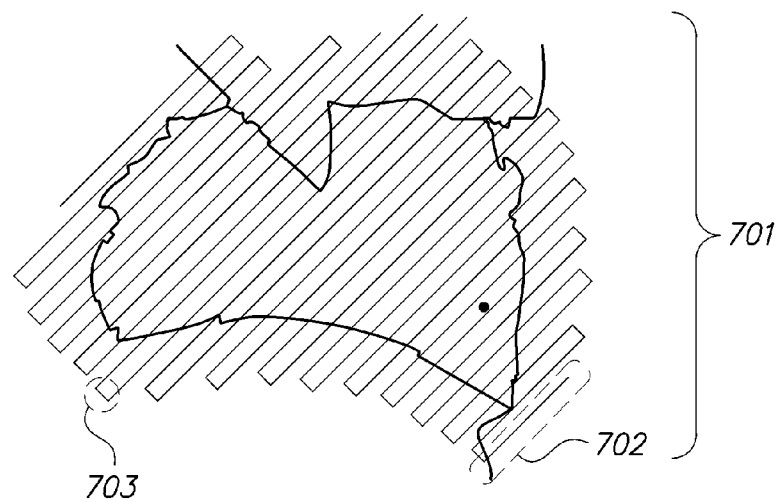
FIG. 7 conceptually illustrates selected details of an example flight plan for embodiments of capturing oblique imagery covering Alexandria County, Va., using the camera-set of FIG. 6.

FIG. 7 conceptually illustrates selected details of an example flight plan for an embodiment of capturing oblique imagery covering Alexandria County, Va., using the camera-set of FIG. 6. Flight plan 701 is arranged in 25 flight lines (e.g., 702) with nominal headings northeast or southwest, separated by 24 turns (e.g., 703) and captures oblique images that are oriented north, south, east and west. FIG. 7 highlights selected benefits, in some usage scenarios, of embodiments using a rotated camera-set with twisted sensors. The total flight distance is 193 kilometers, compared to 264 kilometers for a Maltese Cross system and thus reduces the cost of collection by approximately 27%.

Figure 8A:
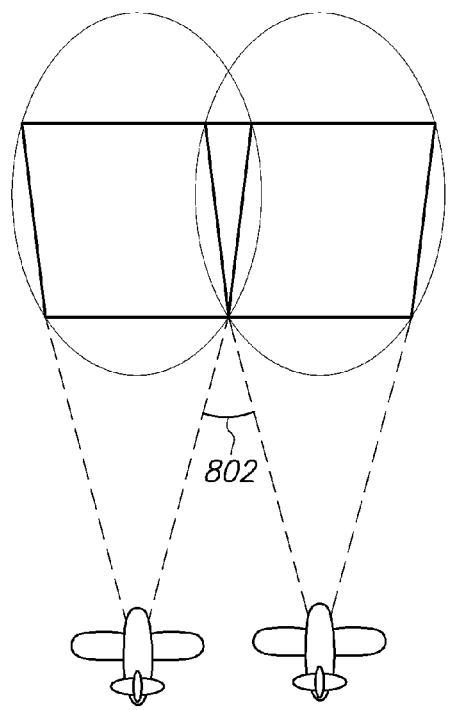
FIG. 8A conceptually illustrates selected details of the FOV of the forward camera from two adjacent flight lines for a Maltese Cross camera-set capturing oblique imagery.

FIG. 8A conceptually illustrates selected details of the FOV of the forward camera from two adjacent flight lines for a Maltese Cross camera-set capturing oblique imagery. In some scenarios there is some overlap between the image strips swept out by these two swaths, but FIG. 8A omits this overlap for clarity of presentation. Angle 802 is defined by the two camera positions on the two adjacent flight lines, and the point at which the two swaths join. When oblique imagery from the two flight lines are stitched together, visual artifacts such as building lean will be less noticeable if angle 802 is smaller. Thus, minimizing and/or reducing angle 802 enables improved visual quality.

Figure 8B:
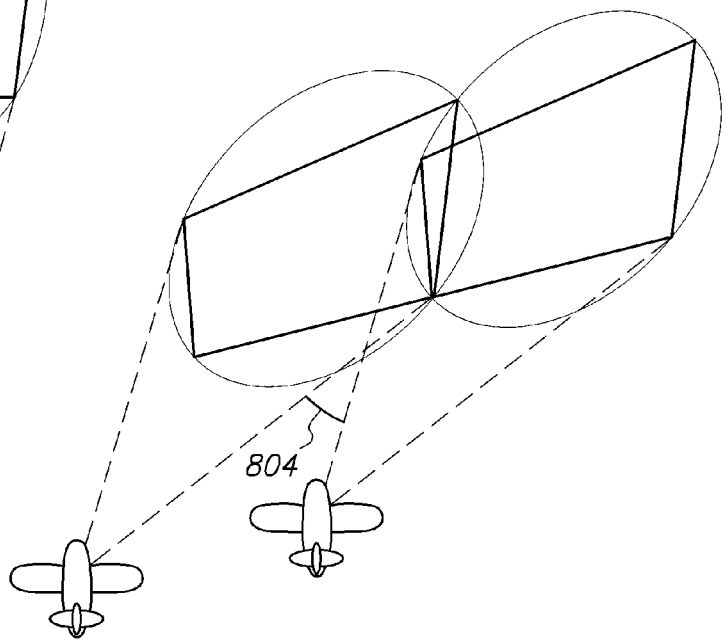
FIG. 8B conceptually illustrates selected details of the FOV of the forward-right camera from two adjacent flight lines for an embodiment of capturing oblique imagery via a camera-set with rotated emerging optical axes and distortion correcting sensors.

FIG. 8B conceptually illustrates selected details of the FOV of the forward camera from two adjacent flight lines for an embodiment of capturing oblique imagery via a camera-set with rotated emerging optical axes and distortion correcting sensors. In some scenarios there is some overlap between the image strips swept out by these two swaths, but FIG. 8B omits this overlap for clarity of presentation. Angle 804 between two adjacent flight lines and the joint where the two swaths meet is smaller due to the geometry of the camera-set and twisted sensors. When oblique imagery from the two flight lines are stitched together, visual artifacts such as building lean are reduced, because angle 804 is relatively smaller, resulting in superior visual quality.

Figure 9:
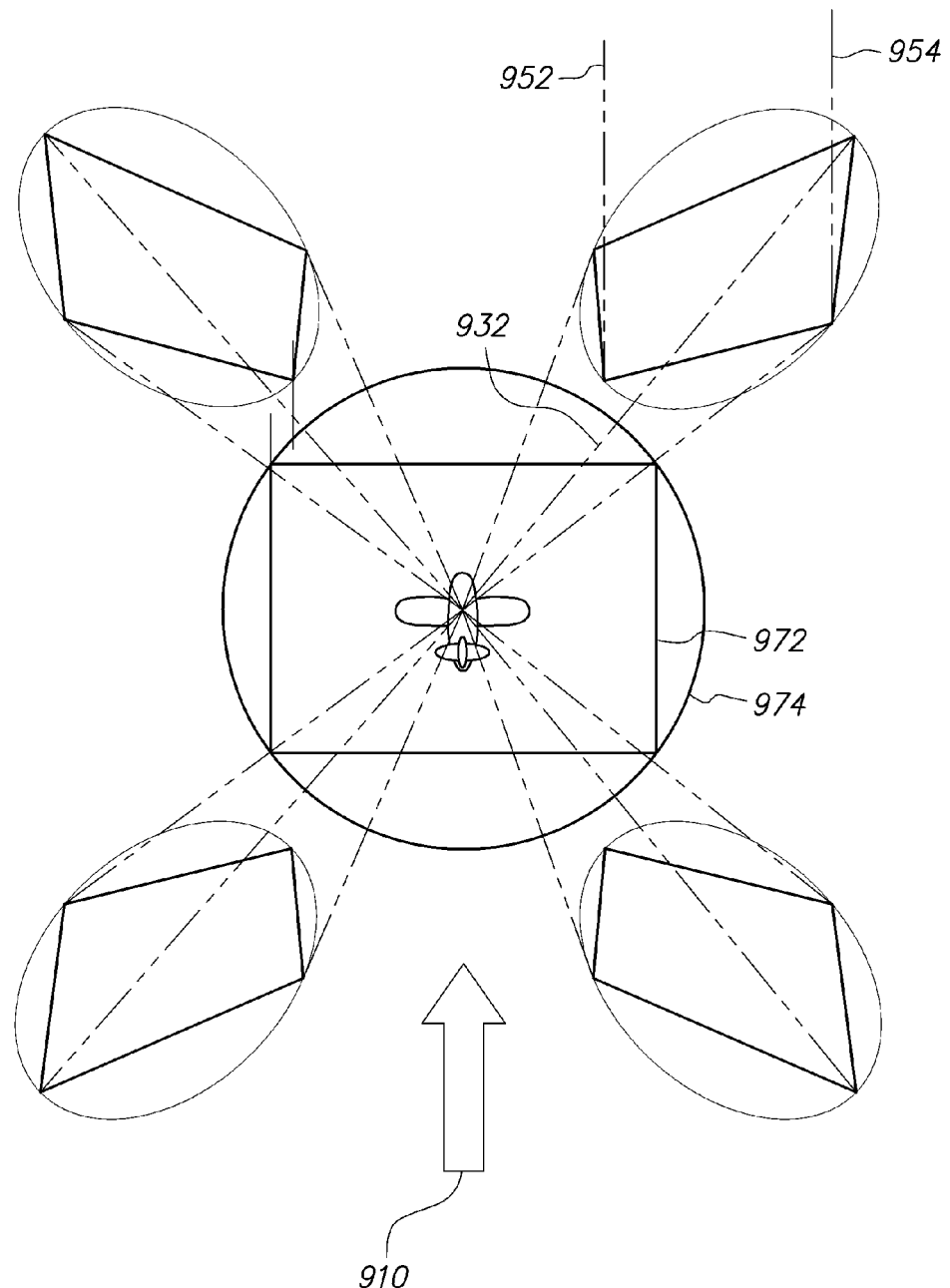
FIG. 9 conceptually illustrates a plan view of an embodiment of capturing oblique and nadir imagery via a camera-set with rotated emerging optical axes and distortion correcting sensors, where the nadir and oblique swaths overlap slightly.

FIG. 9 conceptually illustrates a plan view of selected details of an embodiment of capturing oblique and nadir imagery via a camera-set with rotated emerging optical axes and distortion correcting sensors, where the nadir and oblique swaths overlap slightly. The oblique cameras are conceptually identical to the one shown in FIG. 6 (e.g., same down and plan angles, focal length and image sensor size).

The projected field of view of the nadir camera lens 974 is a circle that contains the projected sensor FOV 972, which is a square inscribed in the circle. The swath of the nadir camera is bounded by the Projected Sensor FOV. The swath of the camera with emerging optical axis 932 is bounded by inner edge 952 and outer edge 954. Note that the swath of the nadir camera slightly overlaps the swath of the oblique camera, since the Projected Sensor FOV extends past the Inner Edge. However, simultaneous exposures on the nadir camera do not overlap with the oblique camera. The overlap enables relatively high quality imagery and creates a triple baseline stereopsis for any given point in this range (e.g., two oblique shots and a nadir shot).

Figure 10:
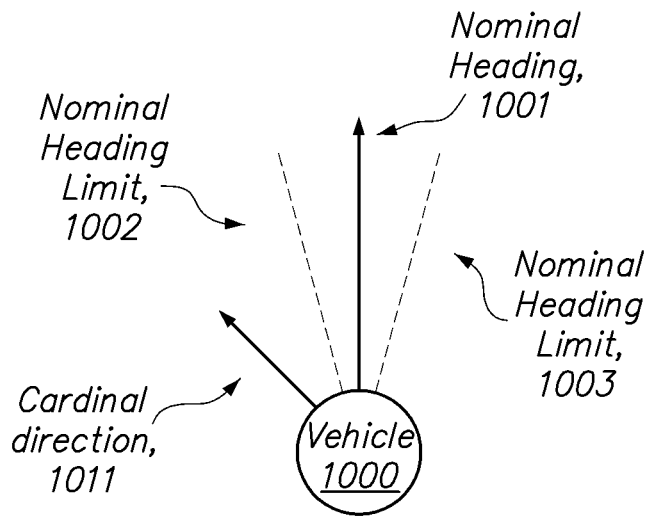
FIG. 10 conceptually illustrates a plan view of selected details of embodiments of a vehicle traveling diagonally.

FIG. 10 conceptually illustrates a plan view of selected details of embodiments of a vehicle traveling diagonally. Nominal Heading Limits 1002 and 1003 form an angular offset range from a Cardinal Direction 1011 (e.g., North). Vehicle 1000 establishes a Nominal Heading 1001 that falls between the Nominal Heading Limits (e g, falling within the angular offset range). In some embodiments, the Nominal Heading is enabled to change as long as it stays within the Nominal Heading Limits (e.g., if the camera is mounted to the vehicle without a stabilizer).

In some embodiments of a Vehicle with a camera-set enabled to capture oblique imagery, the Nominal Heading Limits may be determined by the number of camera-groups in the camera-set. In some embodiments with N oblique camera-groups, the Nominal Heading Limits are 300/(2*N) and 420/(2*N) degrees. For example, in an embodiment with 4 oblique camera-groups, the angular offset range is 37.5-52.5 degrees (alternatively expressed as 45±7.5 degrees) from a cardinal direction, meaning that the vehicle travels diagonally, or approximately Northwest, Northeast, Southwest, or Southeast. In various scenarios, traveling diagonally enhances the productivity of aerial image collection.

Figure 11:
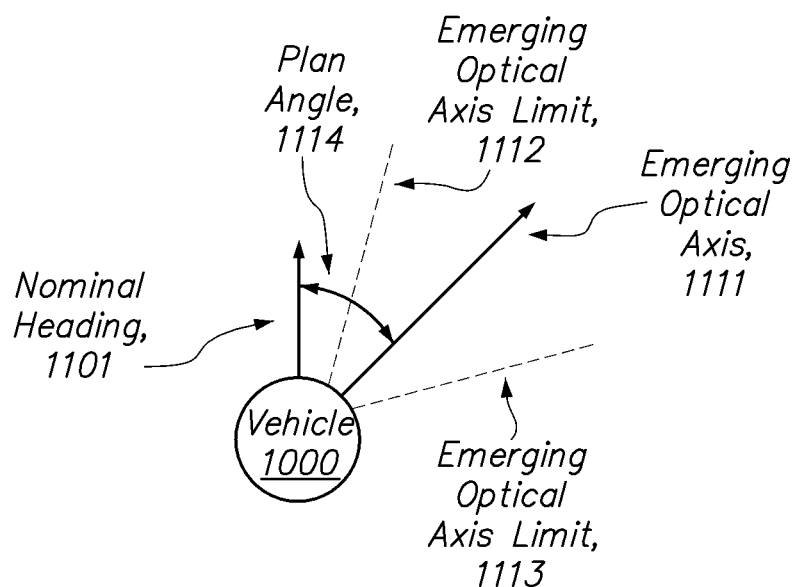
FIG. 11 conceptually illustrates a plan view of selected details of embodiments of a vehicle with a rotated oblique camera-set.

FIG. 11 conceptually illustrates a plan view of selected details of embodiments of a vehicle with a rotated oblique camera-set. Vehicle 1000 has a camera-set with any number of camera-groups enabled to capture oblique imagery (e.g., two, four, seven, eight, etc.), but for clarity only a single camera-group is shown in FIG. 11. Plan Angle 1114 is the angle between Emerging Optical Axis 1111 and Nominal Heading 1101. The Emerging Optical Axis Limits 1112 and 1113 form a plan angle range. The camera-group is configured such that the Emerging Optical Axis falls between the Emerging Optical Axis Limits (e g, falling within the angular separation range). This enables the Emerging Optical Axes to be biased, as described in a subsequent section. Each camera-group has a different angular separation range and therefore a different configuration. In various scenarios, the Emerging Optical Axis of a camera-group is allowed to vary during oblique image collection (e.g., to accommodate a stabilizer), as long as the Emerging Optical Axis stays within the Emerging Optical Axis Limits.

In some embodiments with a rotated camera-set, the Emerging Optical Axis Limits of each camera-group are optionally determined by the number of camera-groups in the camera-set. In some embodiments with N camera-groups, the angular separation range of the Kth camera-group is (180+360*K)/N±120/N degrees from the Nominal Heading. For example, in an embodiment with 4 oblique camera-groups the angular separation ranges are 45±30, 135±30, 225±30, and 315±30 degrees from the Nominal Heading. If the established Nominal Heading of the Vehicle is a cardinal direction (e.g., North), then the angular separation ranges approximately correspond to Northwest, Northeast, Southwest, and Southeast. If the established Nominal Heading of the Vehicle is an intercardinal direction (e.g., Northwest), then the angular separation ranges approximately correspond to North, South, East, and West. This arrangement enables improved image quality and collection efficiency, such as when the camera-groups use distortion correcting electronic sensors. In other embodiments, a vehicle with a rotated camera-set travels diagonally while collecting oblique images, improving collection efficiency and image quality.

Biased Emerging Optical Axes

In various embodiments, the emerging optical axes of the cameras in the camera-set are statically biased towards the nominal heading. For example, with four cameras, the emerging optical axes are positioned at 40, 140, 220, and 320 degrees from the nominal heading. The biased configuration is, in some usage scenarios, beneficial because it reduces the impact of the sun on image quality and thus extends the time window for collecting oblique imagery.

In some scenarios, the biased configuration biases the emerging optical axes away from the sun at various times of the day for certain travel patterns (e.g., flying northeast-southwest in the northern hemisphere before solar noon). In other usage models, the biasing reduces glare from the sun that is reflected off the ground (e.g., from water, dew, snow, etc.).

In other scenarios, the biasing reduces the distance between the nominal heading and the inside edges of the swaths of the oblique cameras. This decreases the size of the nadir swath needed to have overlap between the nadir and oblique swathes, thereby decreasing the cost and complexity of the nadir camera.

Distortion Correcting Sensors

In various embodiments, the electronic image sensors in the cameras of the camera-set are distortion correcting electronic image sensors. The emerging optical axis of an oblique camera is at an angle to the ground, herein called the down angle, for example between 20-70 degrees (or alternatively anywhere in the interval (0,90) degrees). As a result of the down angle, the sensor field of view is distorted when projected through the camera lens to the ground. For example, a rectangular sensor projects to a trapezium on the ground. In the case of a twist angle equal to zero, a rectangular sensor projects to a trapezoid on the ground. In other scenarios, changes in the medium between the camera and the ground conditionally distort the sensor FOV projection (e.g., if the camera, mounted in air, is capturing an oblique view of the sea bottom through seawater under a horizontal glass window). An example of a distortion correcting sensor is a sensor that reduces this distortion, thereby improving sensor utilization and collection efficiency.

Figure 12A:
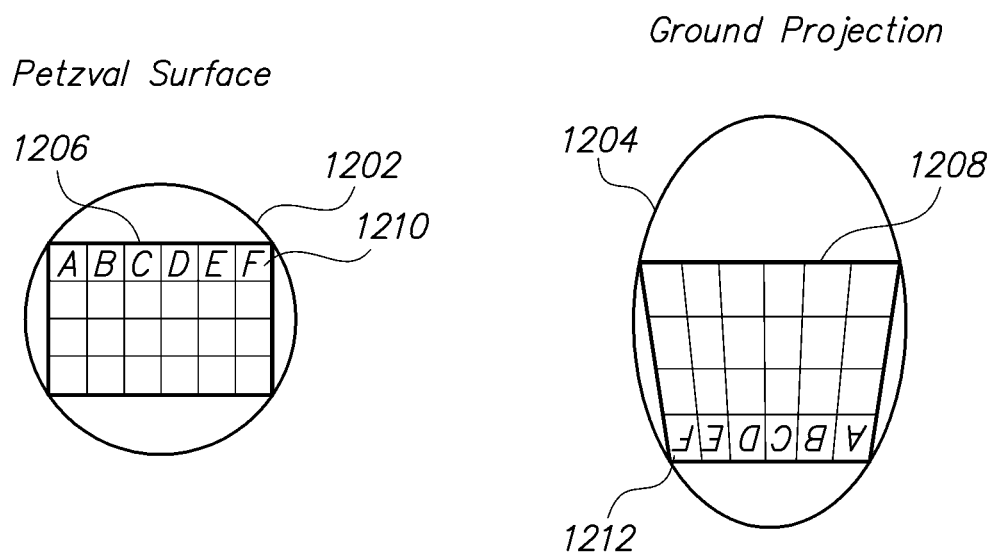
FIG. 12A conceptually illustrates selected details of embodiments of an oblique camera with an electronic image sensor that projects to a distorted sensor field of view.

FIG. 12A conceptually illustrates selected details of embodiments of an oblique camera with an electronic image sensor that projects to a distorted sensor field of view. Electronic Image Sensor 1206 is a rectangular, uniform array of pixels organized into rows and columns, an example pixel being Pixel 1210. The Electronic Image Sensor is contained within Lens Field 1202, geometrically forming a rectangle inscribed within a circle. In the illustrated embodiment, the oblique camera is part of a Maltese Cross camera-set. When projected to the ground, Lens FOV 1204 is distorted vertically by the projection from a circle to an ellipse. The Sensor FOV 1208 is similarly distorted from an inscribed rectangle to an inscribed trapezoid. Projected Pixel 1212 is the ground projection of Pixel 1210 and demonstrates the transformation (e.g., a combined vertical and horizontal reflection) caused by the projection.

Figure 12B:
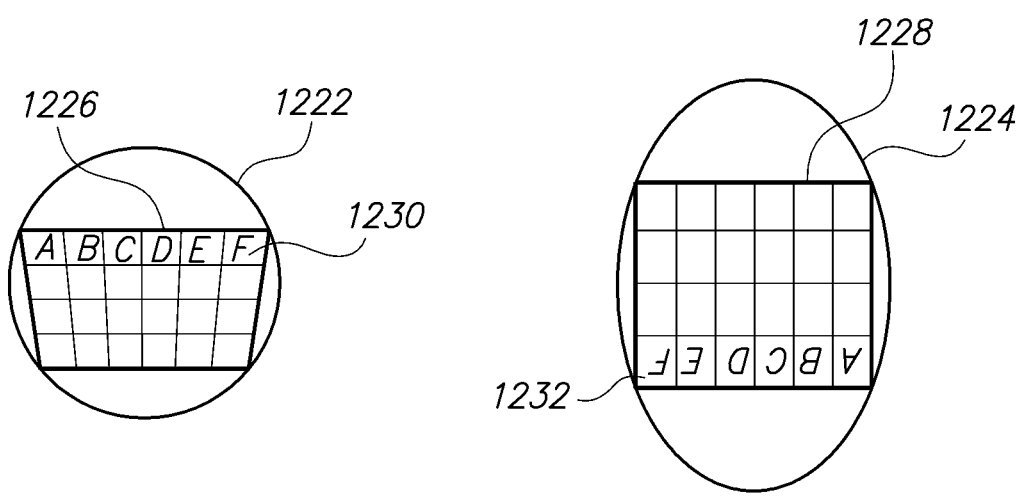
FIG. 12B conceptually illustrates selected details of embodiments of an oblique camera with a non-uniform distortion correcting electronic image sensor that projects to a corrected sensor field of view.

FIG. 12B conceptually illustrates selected details of embodiments of an oblique camera with a non-uniform distortion correcting electronic image sensor that projects to a corrected sensor field of view. Distortion Correcting Electronic Image Sensor 1226 is a trapezoidal, non-uniform array of pixels organized into rows and columns, an example pixel being Pixel 1230. The Distortion Correcting Electronic Image Sensor is contained within Lens Field 1222, geometrically forming a trapezoid inscribed within a circle. In the illustrated embodiment, the oblique camera is part of a Maltese Cross camera-set. When projected to the ground, the Lens FOV 1224 is distorted vertically by the projection from a circle to an ellipse. The Sensor FOV 1228 of the non-uniform pixel array sensor is similarly distorted; however, it is distorted from an inscribed trapezoid to an approximate inscribed rectangle. More specifically, the non-uniform array of pixels is projected to a nearly uniform array of pixels on the ground. Projected Pixel 1232 is the ground projection of Pixel 1230 and demonstrates that in some embodiments, the non-uniform pixel array is designed to nearly completely cancel the distortion caused by the projection. This enhances, in some usage scenarios, the efficiency of oblique imagery collection, as the entire swath of the camera is usable because the distortion has been mostly corrected. Additionally, the projection of the pixels to the ground is relatively more uniform across the Sensor FOV, which in some usage scenarios increases the minimum signal-to-noise ratio of the collected imagery across the entire swath, thereby increasing the quality of the collected imagery. In various embodiments, the oblique camera is in a non-Maltese Cross configuration (e.g., diagonal).

Figure 13:
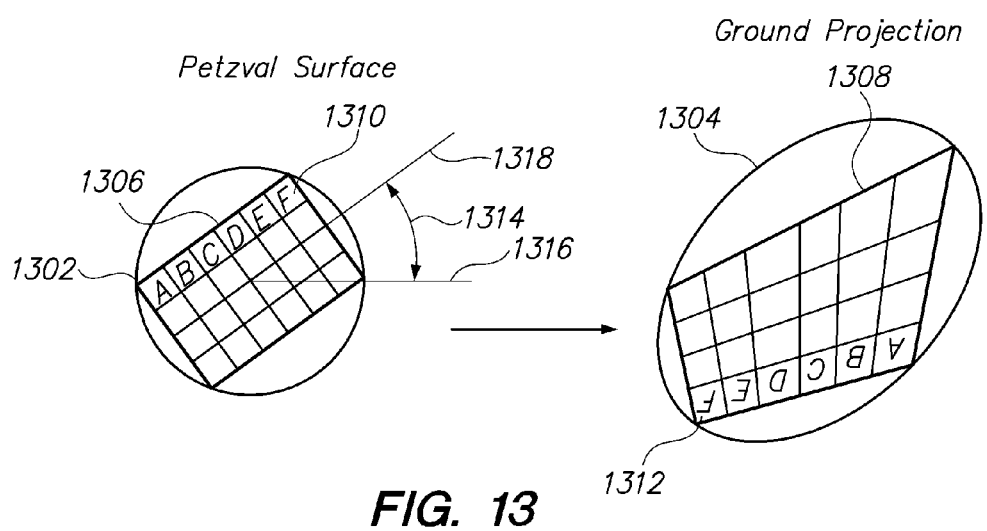
FIG. 13 conceptually illustrates selected details of embodiments of a diagonal oblique camera with a rotated distortion correcting electronic image sensor that projects to a partially corrected sensor field of view.

FIG. 13 conceptually illustrates selected details of embodiments of a diagonal oblique camera with a rotated distortion correcting electronic image sensor that projects to a partially corrected sensor field of view. Rotated Electronic Image Sensor 1306 is a rectangular, uniform array of pixels organized into rows and columns, an example pixel being Pixel 1310. The Rotated Electronic Image Sensor is contained within Lens Field 1302, geometrically forming a rectangle inscribed within a circle. However, the Rotated Electronic Image Sensor is rotated around the optical axis of the camera by Twist Angle 1314, which is the angle between Image Sensor Row Vector 1318 and Horizontal Vector 1316.

Because the oblique camera is projecting diagonally, the Lens FOV 1304 is distorted vertically and horizontally by the projection from a circle to an ellipse. The Sensor FOV 1308 of the rotated sensor is similarly distorted from a rotated inscribed rectangle to a rotated inscribed trapezium. For example, Projected Pixel 1312 is a projection of Pixel 1310 that is distorted. However, the distortion stretches the rotated sensor FOV vertically and horizontally, thereby reducing the horizontal distortion compared to an unrotated sensor. This enhances, in some usage scenarios, the efficiency of oblique imagery collection, as more of the swath of the camera is usable because the distortion has been reduced. Additionally, the projection of the pixels to the ground is relatively more uniform across the Sensor FOV, which in some usage scenarios increases the minimum signal-to-noise ratio of the collected imagery across the entire swath, thereby increasing the quality of the collected imagery. Conceptually, the non-uniform pixel array of FIG. 12B nearly completely corrects distortion while the Rotated Electronic Image Sensor is a linear approximation of a perfect correction.

In some embodiments, the twist angle of the electronic image sensor is partially determined by the plan and down angles of the oblique camera. In various embodiments, for an oblique camera with plan and down angles of 45 degrees, the twist angle is approximately 53 degrees. This configuration decreases the difference in length between the shortest and longest projected pixel row, improving collection efficiency. In some embodiments, the twist angle is adjustable via an adjustment mechanism. Example adjustment mechanisms include any one or more of a screw, an actuator and a bearing (e.g., a flexure), and a piezoelectric actuator.

Figure 14:
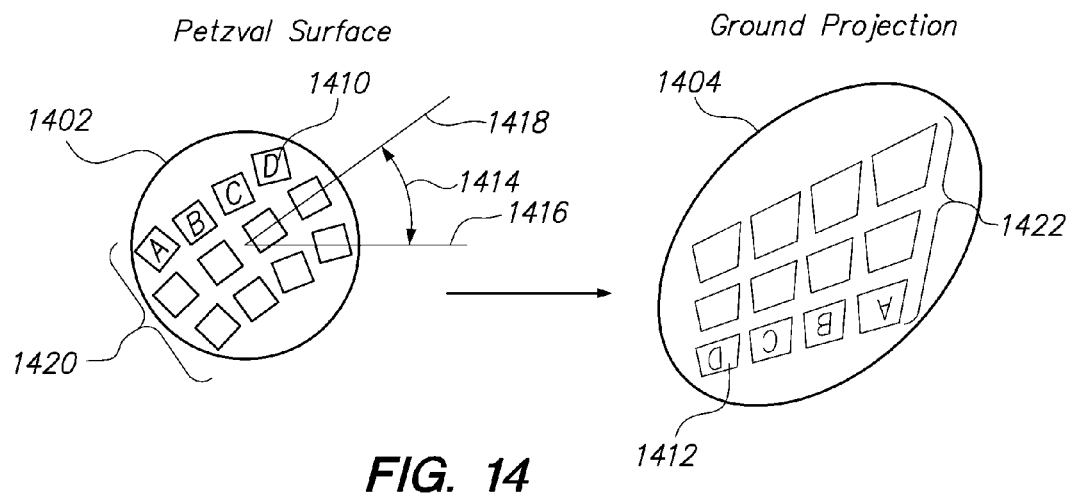
FIG. 14 conceptually illustrates selected details of embodiments of a diagonal oblique camera with a rotated array of rotated distortion correcting electronic image sensors that projects to an array of partially corrected sensor fields of view.

FIG. 14 conceptually illustrates selected details of embodiments of a diagonal oblique camera with a rotated array of rotated distortion correcting electronic image sensors that projects to an array of partially corrected sensor fields of view. The Rotated Array of Rotated Electronic Image Sensors is contained within Lens Field 1402, geometrically forming a rectangular array inside a circle. Conceptually, a first rotation applies to all electronic image sensors and an individual rotation is also applied to each individual electronic image sensor. Rotated Array of Rotated Electronic Image Sensors 1420 is a rectangular array of multiple image sensors organized into rows. In some embodiments, the Rotated Array of Rotated Electronic Image Sensors is a staggered and/or butted array. In FIG. 14, the rows of electronic image sensors are also organized into columns; in other embodiments, the rows of electronic image sensors are staggered. Each electronic image sensor is a rectangular, uniform array of pixels organized into rows and columns, e.g., Rotated Electronic Image Sensor 1410. The entire Rotated Array of Rotated Electronic Image Sensors is rotated around the optical axis of the camera by Twist Angle 1414, which is the angle between Image Sensor Array Row Axis 1418 and Horizontal Vector 1416. In addition, each rotated electronic image sensor is individually rotated around the optical axis of the camera.

Because the oblique camera is projecting diagonally, the Lens FOV 1404 is distorted vertically and horizontally by the projection from a circle to an ellipse. Projected Rotated Array of Rotated Electronic Image Sensors 1422 is similarly distorted from a rotated rectangular array to a rotated trapezium array. The sensor FOVs of the rotated sensors within the array (e.g., Sensor FOV 1412) are similarly distorted from rotated rectangles to rotated trapeziums. However, the distortion stretches and shears the rotated array and the rotated sensor FOVs vertically and horizontally, thereby improving the alignment of the e.g., column vectors with the nominal heading compared to an unrotated array of sensors. This enhances, in some usage scenarios, the efficiency of oblique imagery collection because more of the swath of the camera is usable. Additionally, the projection of the pixels to the ground is relatively more uniform across the Sensor FOVs, which in some usage scenarios increases the minimum signal-to-noise ratio of the collected imagery across the entire swath, thereby increasing the quality of the collected imagery. Conceptually, the non-uniform pixel array of FIG. 12B nearly completely corrects distortion while the Rotated Array of Rotated Electronic Image Sensors is a piece-wise linear approximation of a perfect correction.

In some embodiments, the twist angle is determined by the plan and down angles, and the individual rotations are further determined by the position of each electronic image sensor within the lens field. An individual rotation is determined with reference to a line bisecting the sensor FOV crossing the midpoints of the forward and rear edges of the sensor FOV. The individual rotation is varied until this bisected line is aligned to a common axis (e.g., the nominal heading). In various embodiments, for an oblique camera with 45 degree plan and down angles, the twist angle for the entire array is approximately 53 degrees and the twist angles of the individual sensors relative to the array vary from −10 to +10 degrees. In various embodiments, the twist angle and/or the individual rotations are adjustable via one or more adjustment mechanisms. Example adjustment mechanisms include any one or more of a screw, an actuator and a bearing, and a piezoelectric actuator.

Rotated electronic image sensors and rotated arrays of rotated electronic image sensors are usable with a variety of oblique cameras, camera-sets, vehicles and nominal headings. For example, one embodiment includes a vehicle that travels on a nominal heading of approximately 45 degrees from a cardinal direction with four oblique cameras configured with down angles of approximately 45 degrees, and plan angles of approximately 45, 135, 225 and 315 degrees, with the 45 and 225 degree plan angle cameras including arrays of rotated image sensors with twist angles of 53 degrees, and with the 135 and 315 degree plan angle cameras including arrays of rotated image sensors with twist angles of −53 degrees.

Oblique Imagery Collection and Analysis

Figure 15:
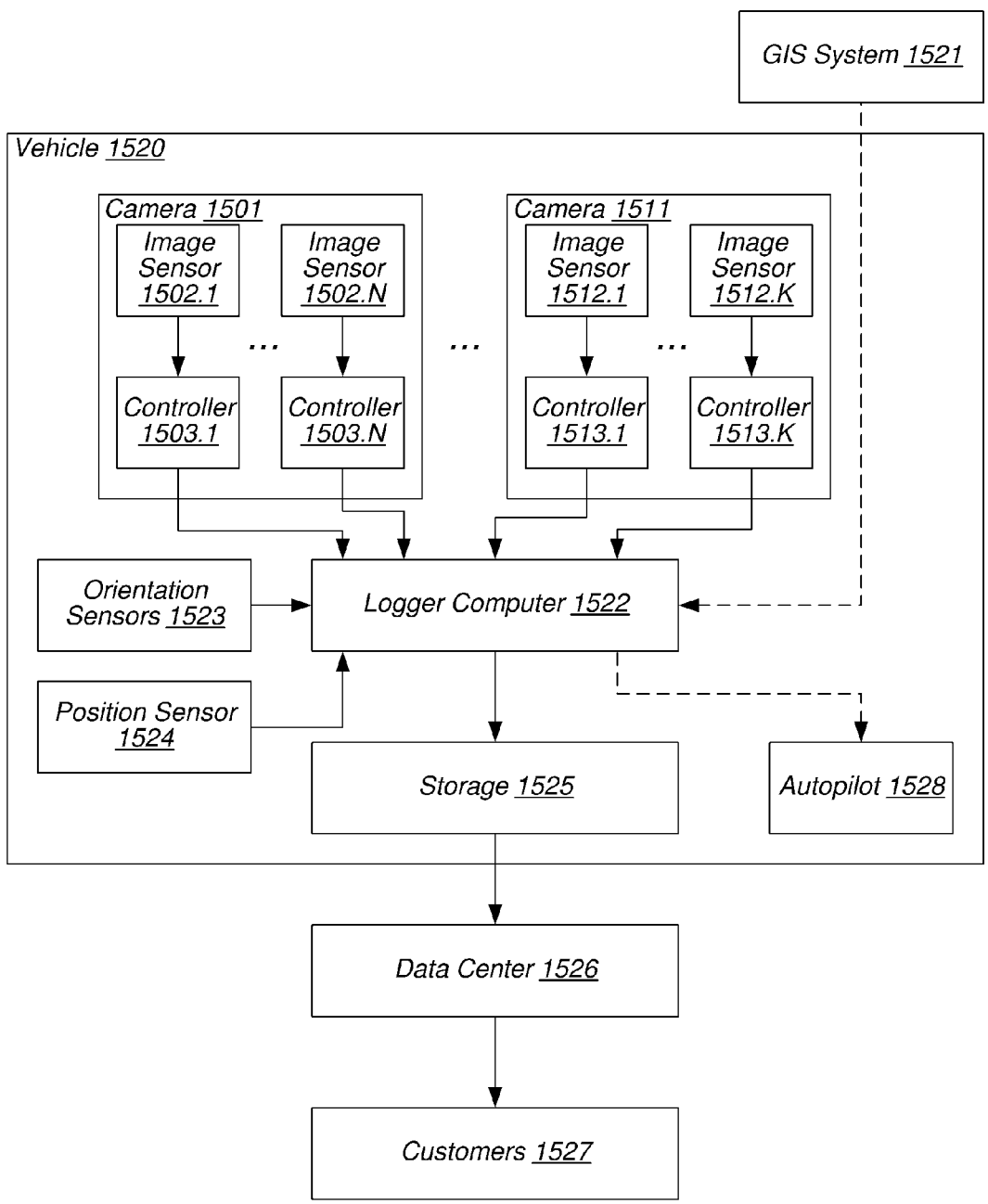
FIG. 15 conceptually illustrates selected logical details of embodiments of a vehicle-based image collection and analysis system.

FIG. 15 conceptually illustrates selected logical details of embodiments of a vehicle-based image collection and analysis system. Note that in the figure, for simplicity of representation, the various arrows are unidirectional, indicating direction of data flows in some embodiments. In various embodiments, any portions or all of the indicated data flows are bidirectional and/or one or more control information flows are bidirectional. GIS system 1521 is a Geospatial Information System. An example of a GIS system is a computer running GIS software (e.g., ArcGIS or Google Earth). In some embodiments, the GIS System plans the image collection process (e.g., selecting the flight path based on various conditions and inputs). The GIS system is coupled to Logger Computer 1522 wirelessly, e.g., via a cellular or WiFi network.

Vehicle 1520 includes an image collection platform, including one or more Cameras 1501 . . . 1511, Logger Computer 1522, one or more Orientation Sensors 1523, one or more Position Sensor 1524 elements, Storage 1525, and Autopilot 1528. Examples of a vehicle are a plane, e.g., a Cessna 206H, a Beechcraft B200 King Air, and a Cessna Citation CJ2. In some embodiments, vehicles other than a plane (e.g., a boat, a car, an unmanned aerial vehicle) include the image collection platform.

Cameras 1501 . . . 1511 include one or more image sensors and one or more controllers, e.g., Camera 1501 includes Image Sensors 1502.1 . . . 1502.N and controllers 1503.1 . . . 1503.N. In various embodiments, the controllers are implemented as any combination of any one or more Field-Programmable Gate Arrays (FPGAs), Application Specific Integrated Circuits (ASICs), and software elements executing on one or more general and/or special purpose processors. In some embodiments, each image sensor is coupled to a controller, e.g., Image Sensor 1502.1 is coupled to Controller 1503.1. In other embodiments, multiple image sensors are coupled to a single controller. Controllers 1503.1 . . . 1503.N . . . 1513.1 . . . 1513.K are coupled to the Logger Computer, e.g., via CameraLink, Ethernet, or PCI-Express and transmit image data to the Logger Computer. In various embodiments, one or more of the Cameras are enabled to capture oblique imagery. In some embodiments, one or more of the Cameras are enabled to capture nadir imagery.

The Orientation Sensors measure, record, and timestamp orientation data, e.g., the orientation of cameras. In various embodiments, the Orientation Sensors include one or more Inertial Measurement Units (IMUs), and/or one or more magnetic compasses. The Position Sensor measures, records, and timestamps position data, e.g., the GPS coordinates of the Cameras. In various embodiments, the Position Sensor includes one or more of a GPS sensor and/or linear accelerometers. The Orientation Sensors and the Position Sensor are coupled to the Logger Computer, e.g., via Ethernet cable and/or serial cable and respectively transmit timestamped orientation and position data to the Logger Computer.

The Logger Computer is coupled to the Storage e.g., via PCI-Express and/or Serial ATA, and is enabled to copy and/or move received data (e.g., from the Orientation Sensors, the Position Sensor, and/or the Controllers) to the Storage. In various embodiments, the Logger Computer is a server and/or a PC enabled to execute logging software. The Storage includes one or more forms of non-volatile storage, e.g., solid-state disks and/or hard disks. In some embodiments, the Storage includes one or more arrays, each array include 24 hard disks. In some embodiments, the Storage stores orientation, position, and image data.

The Autopilot is enabled to autonomously steer the Vehicle. In some scenarios, the Autopilot receives information that is manually entered from the Logger Computer (e.g., read by the pilot via a display and typed into the Autopilot).

Data Center 1526 includes one or more computers and further processes and analyzes image, position, and orientation data. In various embodiments, the Data Center is coupled to the Storage via one or more of wireless networking, PCI-Express, wired Ethernet, or other communications link, and the Storage further includes one or more corresponding communications interfaces. In some embodiments, the Storage is enabled to at least at times communicate with the Data Center over extended periods. In some embodiments, at least parts of the Storage at least at times perform short term communications buffering. In some embodiments, the Storage is enabled to at least at times communicate with the Data Center when the Vehicle is on the ground. In some embodiments, one or more of the disks included in the Storage are removable, and the disk contents are communicated to the Data Center via physical relocation of the one or more removable disks. The Data Center is coupled to Customers 1527 via networking (e.g., the Internet) or by physical transportation (e.g., of computer readable media).

Figure 16:
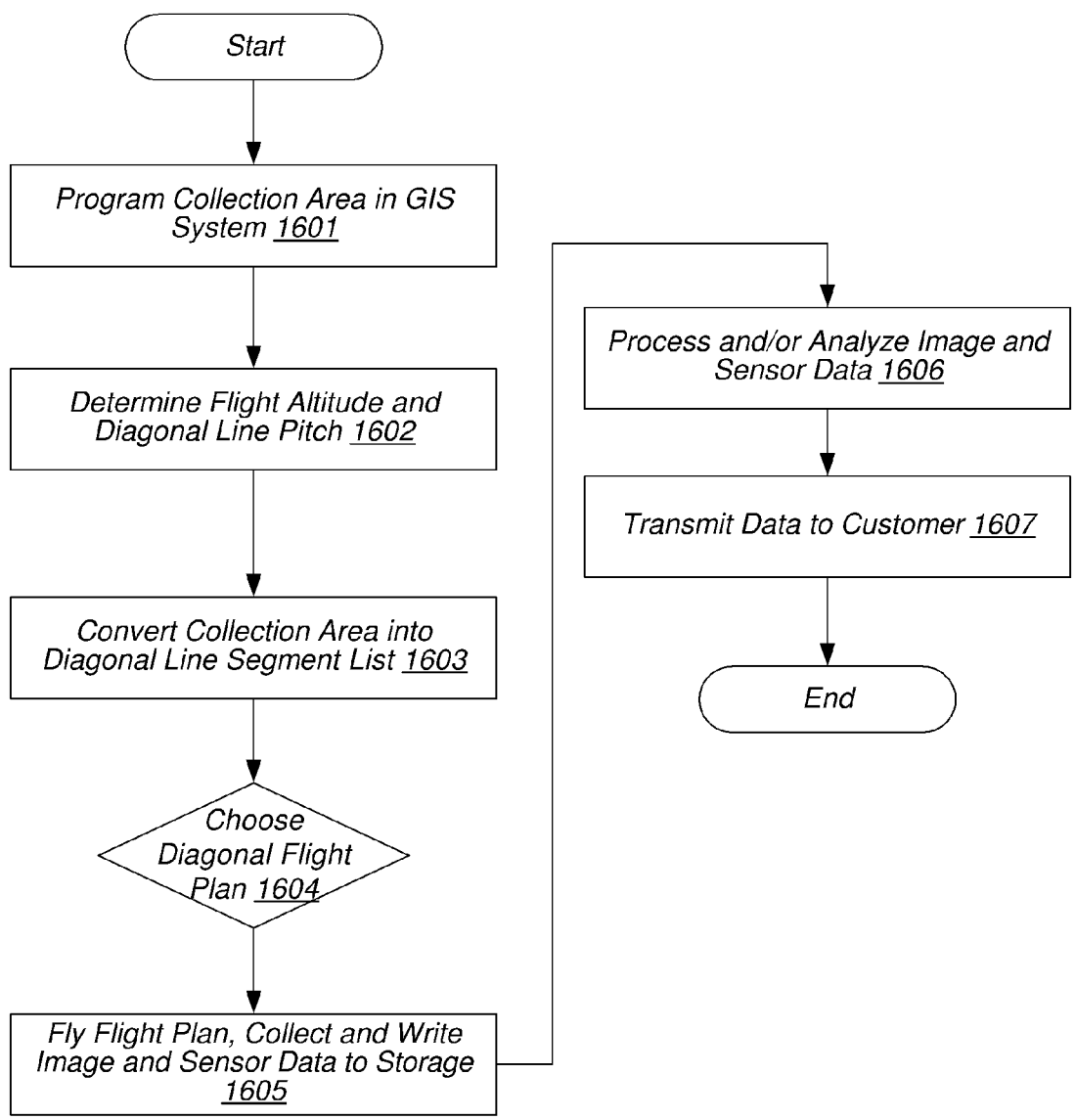
FIG. 16 illustrates a flow diagram of selected details of an embodiment of image collection and analysis wherein the vehicle is a plane.

FIG. 16 illustrates a flow diagram of selected details of an embodiment of image collection and analysis wherein the vehicle is a plane. In various embodiments, a collection area is selected (e.g., from a customer or an operator of the aerial image collection and analysis system). An example of a collection area is a defined geographic region, e.g., a state, a county, or a set of latitude and longitude boundaries. The collection area is programmed into a GIS system in action 1601.

Based on requirements such as desired resolution, ground elevation in the collection area, weather patterns, desired collection overlap, and other factors, the GIS system determines flight altitude and diagonal flight line pitch in action 1602. The flight line pitch is determined in accordance with any increased swath enabled by rotated camera-groups optionally with distortion correcting electronic image sensors. For example, the flight altitude and the diagonal line pitch are selected to achieve the desired resolution (e.g., 10 cm GSD) and ensure that the swaths corresponding to the diagonal flight lines overlap sufficiently (e.g., 5%), accounting for variation in swath width from variations in the altitude above ground (e.g., caused by mountains). In various embodiments, the resolution of the collected imagery is increased by flying the vehicle lower to the ground, while the area collected is increased by flying the vehicle higher above the ground. In some embodiments, the altitude may be determined to fly below clouds or other weather that would interfere with image collection.

Once the flight altitude and the diagonal line pitch are known, the GIS system converts the collection area into a list of diagonal line segments (e.g., line segments that run NW, NE, SE, SW) in action 1603, based on the flight altitude and the diagonal line pitch. If flown, the diagonal line segments cover the collection region.

In action 1604, the GIS system creates a diagonal flight plan by selecting multiple diagonal line segments and connecting them into a single path. In some usage scenarios and/or embodiments, the flight plan is designed to minimize fuel consumption and connects adjacent diagonal line segments with a single turn. For example, FIG. 7 illustrates a hypothetical flight plan covering Alexandria County, Va.

The flight plan is transmitted from the GIS system to the logger computer (e.g., via a cellphone network), where it is read by the pilot (e.g., via a display or a tablet computer) and manually entered into the autopilot. Once the flight plan is entered, the pilot flies the flight plan, with the autopilot controlling the vehicle throughout most of the flight plan, and the image collection platform collects the image, position, and orientation data in action 1605. The image sensor captures image data, that is then compressed and timestamped by the controllers. In some embodiments, the image sensor timestamps image data. In various embodiments, the captured image data is one or more of oblique image data and nadir image data. The logger computer receives timestamped orientation data from the orientation sensors, timestamped position data from the GPS sensors, and timestamped image data from the controllers, and writes the timestamped orientation, position, and image data to the storage. In some embodiments, the timestamped orientation data is discarded and is not written to the storage. In some scenarios, collecting the image, position, and orientation data takes many hours.

In some scenarios, a problem occurs in one or more diagonal flight line segments (e.g., data is incorrectly captured or written incorrectly to storage). In various embodiments, the pilot conditionally directs the autopilot to fly these diagonal flight line segments again, to recollect timestamped image, orientation, and position data, either during the same flight or as part of a subsequent flight. In some embodiments, the vehicle is unmanned and the flight plan is programmed before flight or during flight via remote control.

In various embodiments, any one or more of the line pitch, the line segments, and the flight plan are other than diagonal, such as a cardinal direction (e.g. north, south, east, and west), an intercardinal direction (e.g. northeast, northwest, southeast, and southwest), a direction determined to be oriented parallel to a longest axis of a collection area, or any particular direction. In various embodiments, the GIS system determines any one or more of the line pitch, the line segments, and the flight plan in accordance with one or more respective plan angles associated with one or more cameragroups, independent of orientation of the flight plan.

In various embodiments, any one or more twist angles are specified (optionally in conjunction with one or more respective plan angles) to the GIS system to enable the GIS system to determine an optimal or more nearly optimal flight plan. In various embodiments, one or more twist angles and/or plan angles are specified by the GIS system as ancillary data to a flight plan to form, in aggregate, an enhanced flight plan. In various embodiments, one or more twist angles and/or plan angles are programmable, such that the twist angle and/or plan angle is configured automatically when an enhanced flight plan is loaded.

When the collection is finished, the vehicle stops (e.g., via landing) and the timestamped image, orientation, and position data is moved from the storage to the data center. In some embodiments, the data is moved or copied from the storage to the data center (e.g., over a network, or via PCI-Express). In other embodiments, the storage is physically moved from the vehicle into the data center. In some embodiments, the image, orientation, and position data is further processed in the data center in action 1606. In some embodiments, the image, orientation, and position data is processed; and strips of sequentially captured and overlapping (e.g., by 60%) images are stitched together to form a 2D mosaic of the image collection area (e.g., one mosaic corresponding to each camera). In some embodiments, triangulation is used to produce a 3D model of the collection area from the collected image, orientation, and position data (e.g. from two or more cameras). In some scenarios, the processed imagery is optionally resampled to a different resolution (e.g., data is collected with 10 cm GSD, and downsampled to 20 cm GSD; alternatively, data is collected at 10 cm GSD and super-resolved to 20 cm GSD). In some embodiments, the processed imagery is further analyzed to identify specific features, e.g., a damaged house, a damaged roof, a body, or a tree in proximity to a structure.

Once the imagery has been processed and/or analyzed, all or any portions of results of the processing and/or analyzing is sent to customers as data in action 1607, via the Internet or physical transport of computer readable media (e.g., a hard disk and/or a DVD-ROM, or any other non-volatile storage media). In various embodiments, the data transmitted to the customer is processed imagery, e.g., processed imagery of the collection area. In some embodiments, analyzed imagery is sent to the customer, e.g., the number of houses in the collection area.

In some embodiments, when the flight line segments are diagonal, the processed 2D mosaics have perspectives in cardinal directions. In some embodiments, the flight line segments are in arbitrary directions, while still increasing the swath of the collection, but the perspective of the 2D mosaics is in non-cardinal directions. In some embodiments, the flight line segments and the flight plan are vehicle travel lines and vehicle travel plans e.g., for a car or boat traveling across a collection area.

Figure 17:
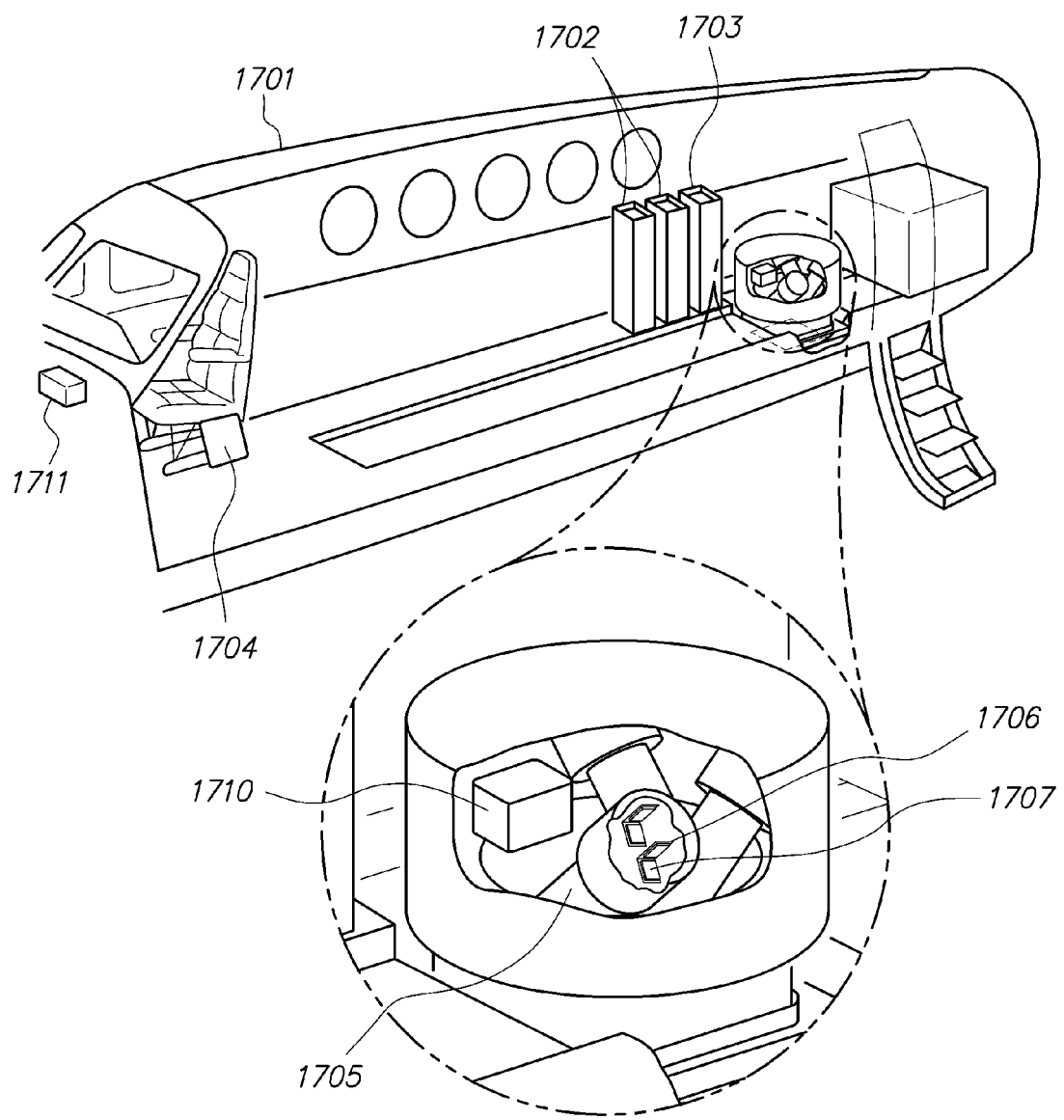
FIG. 17 conceptually illustrates selected physical details of embodiments of a vehicle-based image collection and analysis system.

FIG. 17 conceptually illustrates selected physical details of embodiments of a vehicle-based image collection and analysis system.

Vehicle 1701 includes the image collection platform, including one or more cameras (e.g., Camera 1705), Logger Computer 1703, Display 1704, one or more Orientation and Position Sensors 1710, Storage 1702, and Autopilot 1711. Examples of the Vehicle include a plane, e.g., a Cessna 206H, a Beechcraft B200 King Air, and a Cessna Citation CJ2. In some embodiments, vehicles other than a plane (e.g., a boat, a car, an unmanned aerial vehicle) include the image collection platform.

The Cameras include one or more image sensors and one or more controllers, e.g., Camera 1705 includes Image Sensors 1707 and Controllers 1706. Each of the cameras is pointed towards the ground at an oblique angle, through a view port. In some embodiments, the view port is climate controlled to reduce condensation and temperature gradients to improve the quality of captured image data. In various embodiments, the cameras are stabilized to reduce vibration and shock from the vehicle (e.g., vibrations from the engine, shock from turbulence), thereby improving the quality of captured image data. In various embodiments, storage is removable from the vehicle for physical transport to a data center.

In various embodiments, any one or more of Camera 1705 and Camera 1501 are embodiments and/or implementations of one another. In various embodiments, any one or more of Image Sensor 1707, Image Sensors 1502.1 . . . 1502.N . . . 1512.K, Distortion Correcting Electronic Image Sensor 1226, Rotated Electronic Image Sensor 1306, and Rotated Electronic Image Sensor 1410 are embodiments and/or implementations of one another.

Example Implementation Techniques

In various embodiments the vehicle is an airplane, helicopter, lighter-than-air craft, boat, ship, barge, submersible, satellite, space-craft, car, or truck. In various embodiments, the vehicles are variously manned or unmanned.

In some embodiments, rather than having a single electronic image sensor behind each camera lens, a mosaic of several sensors is used. The mosaic is assembled at a single Petzval surface at the rear of the lens. In other embodiments, the lens admits light through a series of partially reflecting surfaces, so that the image sensors are assembled onto multiple surfaces, with the active areas overlapping. In various embodiments, the partially reflecting surfaces are spectrally selective, to use the different sensors to capture different portions of the electromagnetic spectrum. In some embodiments, the partially reflective surfaces are polarization selective, to use the different sensors to capture the polarization information of the incoming light. In yet other embodiments, the reflecting surfaces divide the incoming light evenly between multiple Petzval surfaces. In various embodiments, the mosaic includes several line-format sensors, each collecting light from different portions of the spectrum.

In some embodiments, a mosaic of line-format sensors is used at the forward and rear edges of the field of view of the lenses, so that the same points on the ground are collected from view angles approximately, e.g., 10 degrees apart, at times separated by, e.g., a few seconds. To capture a combination of depth and spectral information, each lens carries behind it a mosaic of both line-format and area-format sensors. The resulting images are useful for extracting 3D depth information from a scene.

In various embodiments, a vehicle collects oblique imagery (and optionally nadir imagery) along a nominal heading using a plurality of camera-groups. For a first example, two camera-groups are oriented at a same down angle, optionally with a nadir camera. Each of the camera-groups is oriented at a respective plan angle, such as theta and 180 degrees minus theta, or alternatively 180 degrees plus theta and 360 degrees minus theta. For a second example, four camera-groups are oriented at a same down angle, optionally with a nadir camera. Each of the camera-groups is oriented at a respective plan angle, such as theta, 180 degrees minus theta, 180 degrees plus theta, and 360 degrees minus theta.

In the first and the second examples, the same down angle is variously between 20-70 degrees (or alternatively anywhere in the interval (0,90) degrees), according to embodiment and/or usage scenario. In the first and the second examples, theta is any value, such as between 35 and 55 degrees, with specific exemplary values being 40, 45, or 50 degrees, according to embodiment and/or usage scenario. In the first and the second examples, the nominal heading is any value, such as a cardinal direction (e.g. north, south, east, and west), an intercardinal direction (e.g. northeast, northwest, southeast, and southwest), or a direction determined to be oriented parallel to a longest axis of a collection area.

At least one of the camera-groups includes one or more electronic image sensors. In some embodiments, the orienting of camera-groups at a down angle (e.g. to obtain oblique imagery) introduces distortion to images formed on the electronic image sensors.

In some embodiments, any one or more of the electronic image sensors are not enabled to correct the distortion, and in other embodiments, any one or more of the electronic image sensors are enabled to wholly or partially correct for the distortion. Some of the non-distortion correcting image sensors have a zero twist angle. Some of the distortion correcting image sensors have a non-zero twist angle, e.g., to align projected rows (or alternatively columns) of the sensors in a particular manner, such as aligned to the nominal heading, a cardinal direction, an intercardinal direction, or any other alignment. Some of the distortion correcting image sensors include a plurality of sensor elements associated with a particular camera of one of the camera-groups. The plurality of sensors elements is collectively rotated (e.g. by a non-zero twist angle) around an optical axis of the camera, and each of the sensor elements is individually rotated around the optical axis. Some of the non-distortion correcting image sensors have uniform pixel arrays. Some of the distortion correcting image sensors have non-uniform pixel arrays. Some of the distortion correcting image sensors enable image collection with a wider swath than an otherwise identical context with non-distortion correcting image sensors.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. The order and arrangement of flowchart and flow diagram process, action, and function elements are variable according to various embodiments. Also, unless specifically stated to the contrary, value ranges specified, maximum and minimum values used, or other particular specifications (such as number and configuration of cameras or camera-groups, number and configuration of electronic image sensors, nominal heading, down angle, twist angles, and/or plan angles), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other imaging, survey, surveillance, and photogrammetry applications, and are not limited to the particular application or industry of the described embodiments. The invention is thus to be construed as including all possible modifications and variations encompassed within the scope of the claims of the issued patent.

What is claimed is:

1. An method comprising:
operating a vehicle in a nominal heading;
capturing oblique imagery of a surface via one or more respective camera-groups;
wherein at least one of the respective camera-groups is oriented at a particular plan angle with respect to the nominal heading and includes at least one distortion correcting electronic image sensor;
wherein the particular plan angle is an oblique angle with respect to the nominal heading;
wherein the at least one distortion correcting electronic image sensor comprises a plurality of non-uniform pixel elements; and
wherein the at least one distortion correcting electronic image sensor is configured such that the non-uniform pixel elements, when projected onto the surface, are approximately transformed from a trapezoid to a rectangle.

2. An method comprising:
operating a vehicle in a nominal heading;
capturing oblique imagery of a surface via one or more respective camera-groups;
wherein at least one of the respective camera-groups is oriented at a particular plan angle with respect to the nominal heading and includes a plurality of distortion correcting electronic image sensors; wherein the particular plan angle is an oblique angle with respect to the nominal heading; and wherein each of the distortion correcting electronic image sensors is rotated at a respective angle in accordance with any two or more of increasing a swath width, increasing signal-to-noise ratio, and increasing uniformity of projection of pixels onto the surface.

3. An apparatus comprising:
one or more respective camera-groups each enabled to capture oblique imagery of a surface, the respective camera-groups are enabled to operate in a vehicle in accordance with a nominal heading;
at least one distortion correcting electronic image sensor included in at least one of the respective camera-groups, the at least one of the respective camera-groups are oriented at a particular plan angle with respect to the nominal heading;
wherein the particular plan angle is an oblique angle with respect to the nominal heading;
wherein the at least one distortion correcting electronic image sensor comprises a plurality of non-uniform pixel elements; and
wherein the at least one distortion correcting electronic image sensor is configured such that the non-uniform pixel elements, when projected onto the surface, are approximately transformed from a trapezoid to a rectangle.

4. An apparatus comprising:
one or more respective camera-groups each enabled to capture oblique imagery of a surface, the respective camera-groups are enabled to operate in a vehicle in accordance with a nominal heading; at least one distortion correcting electronic image sensor included in at least one of the respective camera-groups, the at least one of the respective camera-groups are oriented at a particular plan angle with respect to the nominal heading;
wherein the at least one of the respective camera-groups is oriented at a particular plan angle with respect to the nominal heading and includes a plurality of distortion correcting electronic image sensors;
wherein the particular plan angle is an oblique angle with respect to the nominal heading; and wherein each of the distortion correcting electronic image sensors is rotated at a respective angle in accordance with any two or more of increasing a swath width, increasing signal-to-noise ratio, and increasing uniformity of projection of pixels onto the surface.

5. The method of claim 1, wherein the capturing oblique imagery is in accordance with a down angle of the at least one of the respective camera-groups, and the configuring is based at least in part on the down angle.

6. The method of claim 1, wherein the configuring is in accordance with any one or more of increasing a swath width, increasing signal-to-noise ratio, and increasing uniformity of projection of pixels onto the surface.

7. The method of claim 1, wherein the oblique angle is any acute angle modulo 90 degrees.

8. The method of claim 1, wherein the oblique angle is between 15 and 75 degrees modulo 90 degrees.

9. The method of claim 1, wherein the vehicle is a flying vehicle and the surface is the ground.

10. The method of claim 7, wherein the oblique angle is any acute angle modulo 90 degrees.

11. The method of claim 7, wherein the oblique angle is between 15 and 75 degrees modulo 90 degrees.

12. The method of claim 7, wherein the vehicle is a flying vehicle and the surface is the ground.

13. The apparatus of claim 3, wherein the capturing oblique imagery is in accordance with a down angle of the at least one of the respective camera-groups, and the configuring is based at least in part on the down angle.

14. The apparatus of claim 3, wherein the configuring is in accordance with any one or more of increasing a swath width, increasing signal-to-noise ratio, and increasing uniformity of projection of pixels onto the surface.

15. The apparatus of claim 3, wherein the oblique angle is any acute angle modulo 90 degrees.

16. The apparatus of claim 3, wherein the oblique angle is between 15 and 75 degrees modulo 90 degrees.

17. The apparatus of claim 3, wherein the vehicle is a flying vehicle and the surface is the ground.

18. The apparatus of claim 4, wherein the oblique angle is any acute angle modulo 90 degrees.

19. The apparatus of claim 4, wherein the oblique angle is between 15 and 75 degrees modulo 90 degrees.

20. The apparatus of claim 4, wherein the vehicle is a flying vehicle and the surface is the ground.

* * * * *